(12) United States Patent
Laubach

(10) Patent No.: US 9,142,193 B2
(45) Date of Patent: Sep. 22, 2015

(54) LINEAR PROGRESSION BASED WINDOW MANAGEMENT

(75) Inventor: Kevin Laubach, Beverly Hills, CA (US)

(73) Assignee: Intellitact LLC, Beverly Hills, CA (US)

( * ) Notice: Subject to any disclaimer, the term of this patent is extended or adjusted under 35 U.S.C. 154(b) by 289 days.

(21) Appl. No.: 13/488,833

(22) Filed: Jun. 5, 2012

(65) Prior Publication Data

US 2012/0242692 A1 Sep. 27, 2012

Related U.S. Application Data

(63) Continuation-in-part of application No. 13/423,204, filed on Mar. 17, 2012, now Pat. No. 8,843,844, and a continuation-in-part of application No. 13/423,212, filed on Mar. 17, 2012, now Pat. No. 8,760,424.

(60) Provisional application No. 61/465,309, filed on Mar. 17, 2011, provisional application No. 61/493,522, filed on Jun. 6, 2011, provisional application No. 61/465,308, filed on Mar. 17, 2011.

(51) Int. Cl.
| | |
|---|---|
| G09G 5/00 | (2006.01) |
| G06F 3/048 | (2013.01) |
| G09G 5/14 | (2006.01) |
| G06F 3/0481 | (2013.01) |

(52) U.S. Cl.
CPC ............... *G09G 5/14* (2013.01); *G06F 3/0481* (2013.01); *G06F 2203/04804* (2013.01); *G09G 2360/08* (2013.01)

(58) Field of Classification Search
USPC ......................................................... 345/629
See application file for complete search history.

(56) References Cited

U.S. PATENT DOCUMENTS

| 4,819,189 | A | * | 4/1989 | Kikuchi et al. ............... 715/797 |
|---|---|---|---|---|
| 5,652,851 | A | * | 7/1997 | Stone et al. .................... 715/804 |
| 5,729,704 | A | * | 3/1998 | Stone et al. .................... 715/804 |
| 5,798,752 | A | * | 8/1998 | Buxton et al. ................. 715/863 |
| 5,835,088 | A | | 11/1998 | Jaaskelainen, Jr. |
| 6,043,817 | A | * | 3/2000 | Bolnick et al. ................ 715/788 |
| 6,072,488 | A | | 6/2000 | McFarland |
| 7,439,975 | B2 | * | 10/2008 | Hsu ............................... 345/426 |
| 8,386,956 | B2 | * | 2/2013 | Ording et al. ................. 715/797 |
| 8,473,859 | B2 | * | 6/2013 | Chaudhri et al. ............. 715/782 |
| 8,555,197 | B2 | * | 10/2013 | Kano et al. .................... 715/794 |

(Continued)

OTHER PUBLICATIONS

International Search Report and Written Opinion for PCT/US12/40875, Aug. 10, 2012, 13 pages.

*Primary Examiner* — M Good Johnson
(74) *Attorney, Agent, or Firm* — Los Angeles Patent Group; Arman Katiraei

(57) ABSTRACT

Some embodiments implement a linear switching application that provides functionality for switching between different windows based on an x-axis ordering of the windows instead of the z-axis or other ordering of prior art. The linear switching application identifies an array of currently open windows and sorts the array based on the leftmost x-coordinate position of the windows in the array. Optionally, the linear switching application modifies the GUI to display window identifiers based on the leftmost x-coordinate position of each window to orient the user to the x-coordinate position of each of the windows on-screen. The application determines an index in the current x-sorted array for the window that is currently frontmost and changes the frontmost window based on the current frontmost window and a directional input provided by the user.

20 Claims, 17 Drawing Sheets

(56) References Cited

U.S. PATENT DOCUMENTS

| | | |
|---|---|---|
| 8,560,960 B2 * | 10/2013 | Goossens et al. ............. 715/782 |
| 8,667,418 B2 * | 3/2014 | Chaudhri et al. ............. 715/835 |
| 2005/0149879 A1 | 7/2005 | Jobs et al. |
| 2006/0075359 A1 * | 4/2006 | Bauchot et al. ............... 715/790 |
| 2006/0161861 A1 | 7/2006 | Holecek et al. |
| 2007/0171224 A1 * | 7/2007 | MacPherson ................. 345/440 |
| 2008/0072154 A1 | 3/2008 | Michaelis et al. |
| 2008/0115081 A1 | 5/2008 | Sankaravadivelu et al. |
| 2010/0257450 A1 * | 10/2010 | Go et al. ....................... 715/733 |
| 2011/0078625 A1 | 3/2011 | Mumford et al. |
| 2011/0181521 A1 * | 7/2011 | Reid et al. ..................... 345/173 |
| 2012/0030569 A1 * | 2/2012 | Migos et al. .................. 715/702 |

\* cited by examiner

LINEAR PROGRESSION BASED WINDOW MANAGEMENT

CLAIM OF BENEFIT TO RELATED APPLICATIONS

This application claims the benefit of U.S. provisional application 61/493,522, entitled "Linear Switcher" filed Jun. 6, 2011, is a continuation-in-part of U.S. non-provisional patent application Ser. No. 13/423,204 entitled "Input Device Enhanced Interface" filed on Mar. 17, 2012 which claims the benefit of U.S. provisional application 61/465,308, entitled "Keyboard Enhanced Interface" filed Mar. 17, 2011, and is a continuation-in-part of U.S. non-provisional patent application Ser. No. 13/423,212 entitled "Touch Enhanced Interface" filed Mar. 17, 2012 which claims the benefit of U.S. provisional application 61/465,309, entitled "Touch Enhanced Interface", filed Mar. 17, 2011. The contents of provisional applications 61/493,522, 61/465,308, and 61/465,309 and non-provisional applications Ser. Nos. 13/423,204 and 13/423,212 are hereby incorporated by reference.

TECHNICAL FIELD

The present invention generally relates to user interface enhancements for computer systems and electronic devices.

BACKGROUND ART

A modern day multi-tasking operating system (OS) allows multiple applications to be running at any given time with each application having one or more open windows. By providing this multi-tasking ability to have multiple open windows, users are able to work with more data and access more functionality simultaneously. However, the more windows that are open, the more challenging it can be for users to access a window with the desired data or functionality. Specifically, users switch between the different open windows in order to access the data or functionality that is provided within each window. For example, a user switches to (1) a first window of a document processing application in order to prepare a first document, (2) a second window of the same document processing application in order to prepare a second document, (3) a window of an email application in order to check emails, (4) a window of a media player application in order to play music tracks, (5) a file explorer window in order to access different files, and (6) a window of a web browser application in order to do research on the Internet.

Switching to a window involves making that window frontmost and providing key focus to that window. The graphical user interface (GUI) of the OS provides various means with which to switch to a particular window. A user can click on a desired window with a graphical pointing tool or touch gesture in order to make that window frontmost (i.e., gain access to the data or functionality associated with that window). However, when several windows are simultaneously displayed on-screen, the windows may overlap in a virtual three-dimensional space, based on the ordering with which each window is launched or accessed, also referred to as the z-order of the windows.

In such cases where windows overlap, the user must often rearrange the position of the windows by dragging them to new positions, or minimize or hide one or more obstructing windows in order to disclose the desired window. This laborious method of switching between windows is further exacerbated by the fact that many users forgo the benefits of viewing multiple windows, preferring instead to maximize, or fill the entire screen, with the window that they are currently working with. In so doing, to access a different window, the maximized window must first be minimized or reduced in size, so that other windows appear on-screen, thereby allowing the user to utilize an on-screen pointer to click, move or resize the desired window(s). It is clear that clicking on windows is an inefficient means with which to switch between different windows when multiple windows are simultaneously open. Finding the desired window becomes more challenging, time-consuming, and frustrating as more windows are open, as is often the case with larger screen sizes and/or multiple displays.

To improve upon window switching, the Windows operating system includes a taskbar that includes symbols for windows that the user may click to make a particular window frontmost. Similarly, the Mac OS X includes an application dock that includes symbols for applications that the user may click to make a particular application's window or windows frontmost. The taskbar and dock are spatially dependent graphical tools that require a layer of abstraction as the user must first identify a symbol corresponding to a desired window or application before clicking on that symbol. While often more effective than rearranging and clicking on windows, this manner of switching between windows is still inefficient. For example, when several applications are open, identifying the desired application from the taskbar or dock becomes overly time consuming as the user visually sorts through the multiple symbols in the taskbar or dock to identify a desired window. In the Windows taskbar, the problem is exacerbated when the taskbar becomes overcrowded and the symbols in the taskbar shrink in size to accommodate symbols for all open windows. As the symbols shrink, they become less readable, causing the user to hover the on-screen pointer, one by one, over each of the symbols, and wait until a pop-up text field identifies the name of the desired window. Furthermore, the symbols in the taskbar move around as windows are opened and closed. The user must therefore repeat the spatial identification step of identifying a position of a symbol that corresponds to the window on the taskbar each time. To select a particular document window in the OS X dock, the user must first click and hold the application symbol corresponding to the document, at which point a menu appears which lists all open documents for that application, among other things. The user must then drag the pointer to the name of the desired document and release the mouse. Furthermore, as more applications are in use or retained in the dock, the symbols become smaller and smaller, so that further mouse-over techniques are required to enable the user to identify the correct symbol.

Because of these and other issues, it is sometimes preferable to switch between windows using the discrete inputs of a key-based input device such as a keyboard. In operating systems such as Windows OS and Mac OS, various keystroke shortcuts are available to invoke a window switching function using discrete keyboard inputs. The window switching function allows a user to switch between different windows by pressing and holding at least a first keyboard key (such as a "Command" key) and then tapping a second keyboard key to select a different window to make frontmost. The first key can then be released and the last selected window remains frontmost. Specifically in Mac OS, holding the "Command" key while tapping the "Tab" key switches between different application windows in a first direction and holding the "Command" and "Shift" keys while tapping the "Tab" key switches between different application windows in a second direction that is opposite to the first direction. The window switching function operates loosely based on which application was most recently frontmost, though the order is hard to discern, and therefore essentially becomes random to the user. Similar functionality is provided in the Windows OS, whereby holding the "Alt" key and tapping the "Tab" key invokes a windows switching function that switches between different windows. Complimentary functionality is also available in the Mac OS, whereby holding the "Command" key while tapping the "Tilde" key switches between windows that belong to the currently active application in the Mac OS. Each of these window switching functions is subject to the same ordering issues discussed below.

For purposes of simplicity and clarity, the following discussion generalizes the phrase "window switching function" to include functionality for switching between application windows and functionality for switching between windows of an active application without limitation. This phrase is meant to also encompass switching between windows, applications, and/or other objects or user interface elements of a GUI.

The above referenced window switching functions are inefficiently implemented for various reasons. Firstly, the ordering of windows used by the window switching function becomes essentially randomized to the user when three or more windows are accessed. Specifically, the order of the applications or windows changes in a seemingly random manner. As a result, there is no repeatable or static correspondence between the different windows in the GUI and the order with which the windows can be selected using the window switching function. Secondly, the existing keyboard shortcuts for performing the window switching function requires users to move at least one hand away from the associated home position keys (e.g., "A", "S", "D", "F", "J", "K", "L", and ";") when using the window switching function, which leads to time-consuming movements that can result in incorrect keys being pressed. Thirdly, reversing directions using the existing window switching functions is awkward for most users, and many users lack sufficient dexterity or do not know the keyboard shortcut for reversing directions because it requires that two non-adjacent keys be held down while a third key is pressed.

Accordingly, there is a need for improved functionality with which to switch between different application and document windows. Specifically, there is a need to switch between different windows without having to recall the order in which the windows were last accessed, and without regard to which application owns which window.

SUMMARY

It is an objective of the present invention to define an apparatus, method, system and computer software product that increases the efficiency and expressivity in the use of key-based input devices. More specifically, it is an objective to increase the efficiency with which a key-based input device can be used to switch between different windows in a graphical user interface. It is an objective to enable switching between different windows based on the x-axis positioning of the windows in the GUI such that the user need not recall the order in which the windows were last accessed, but rather relies on the ordering that is apparent on-screen. It is a further objective of the present invention to enable switching between user interface elements within a single window, such as text fields or other elements which can accept key focus. It is a further objective of the present invention to enable switching within user selected modes that determine switching between all windows, all visible windows, or windows of the frontmost application. It is a further objective to assist the user in visualizing overlapping windows through functionality such as transparency and stagger functionality.

To achieve these and other objectives, some embodiments implement a linear switching application that provides functionality for switching between different windows based on an x-axis ordering of the windows instead of the z-axis or other ordering of prior art. The linear switching application identifies an array of currently open windows. The linear switching application filters the array of windows based on an operating mode of the application. Next, the array is sorted based on the leftmost x-coordinate position of the windows in the array. This sorting arranges the windows in the array to conform with their corresponding visual layout in the GUI. Optionally, the linear switching application modifies the GUI to display window identifiers from the leftmost x-coordinate position of each window. These identifiers are visual cues which help orient the user to the leftmost x-coordinate position of each of the windows on-screen, especially when certain windows overlap or obscure other windows. The application determines an index in the current x-sorted array for the window that is currently frontmost and then changes the array index based on a directional input provided by the user. Changing the index, in turn, changes the frontmost window to the window that is represented by the newly selected index. Each directional input provided by the user selects either the window that is to the right or to the left of the current frontmost window.

In this manner, users are provided a visually and physically consistent and intuitive facility for window and application switching. Moreover, users can easily customize the left-right ordering by merely positioning the windows in a manner that is most convenient to their particular workflow, thereby simultaneously and automatically updating the ordering used by the linear switcher, so that it is readily apparent and unambiguously identifiable on-screen. Perhaps most importantly, consistent ordering of windows in a particular workflow allows the user to develop and utilize muscle memory when switching between windows in a particular workflow, which leads to automatic, effortless operation.

BRIEF DESCRIPTION OF THE DRAWINGS

In order to achieve a better understanding of the nature of the present invention, a preferred embodiment of the linear switcher will now be described, by way of example only, with reference to the accompanying drawings in which.

DETAILED DESCRIPTION

Some embodiments of the present invention provide new methods for switching between different windows in an efficient and repeatable manner. One such method is implemented by the linear switcher application of some embodiments. The linear switcher provides functionality for switching between different windows based on an x-axis ordering of the windows instead of the z-axis or other ordering of prior art. Such switching based on the x-axis ordering provides a contextually obvious and easily invocable means by which users can switch between different windows. Moreover, users can customize the ordering by positioning the windows in a manner that is most convenient to their particular workflow. In this manner, the ordering used by the linear switcher removes one or more levels of abstraction, is readily apparent and unambiguously identifiable on-screen. This consistent and streamlined mode of operation allows muscle memory to be utilized because operations of the linear switcher may be invoked using key combinations that are intuitive and non-awkward to access.

To aid in the discussion below, the term window is used to generally refer to any switchable framework within a graphical user interface. Accordingly, the term window as used herein can refer to a framework that graphically represents different instances of different applications irrespective of the documents or other interactive elements within each application framework. The window as used herein can also refer to a framework that graphically represents different instances of the same application wherein the instances may include different documents that have been opened for the same application or different workspaces, views, etc. that have been opened by the same application. Accordingly, the window switching function of the linear switcher is applicable to any operating system irrespective of the operating system definition of a window. Moreover, as illustrated with reference to FIGS. 22-25, linear switching is also invocable between elements within a single window, such as between UI elements that can accept key focus. This, therefore, extends applicability to devices and operating systems which do not support multiple windows, such as some tablets and other portable devices.

In some embodiments, the linear switcher is an application or independent process running under the OS in the foreground or background. Such an application or process can be adapted for operation with any OS including Microsoft Windows, Apple OS, or various Linux distributions, as well as portable and tablet devices. In some embodiments, the linear switcher is integrated into the OS, and may include features such as an Application Programming Interface (API), scriptability, or other OS integration and accessibility.

Figure 1:
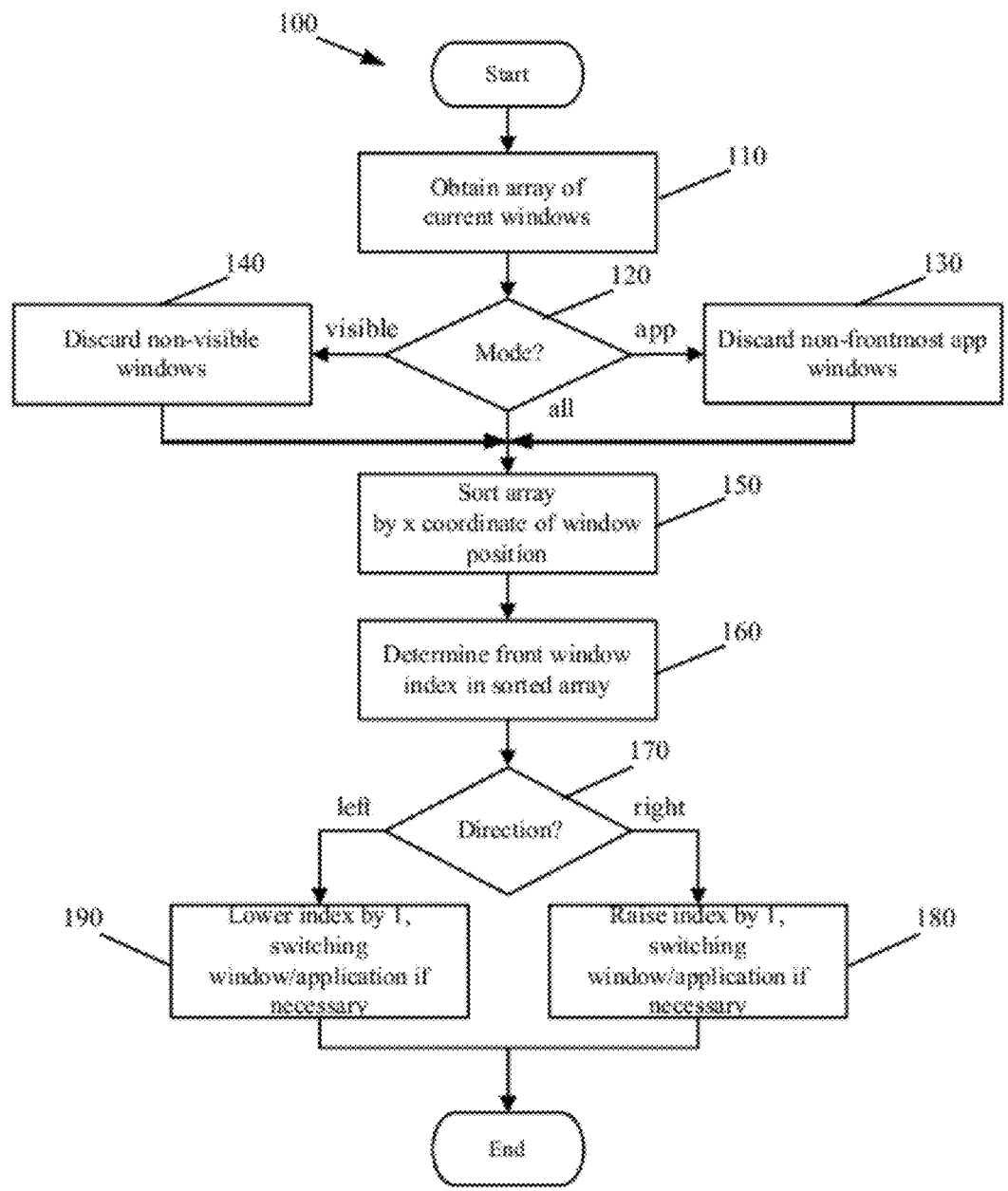
FIG. 1 presents a process performed by the linear switcher to implement the x-order based window switching in accordance with some embodiments.

FIG. 1 presents a process 100 performed by the linear switcher to implement the x-order based window switching in accordance with some embodiments. The process 100 is run at various times as described below, such as when user inputs that invoke the linear switcher signal a desired switch from one open window to another. These user inputs are determined by having the linear switcher monitor system state information such as events that pass through an OS event handler or window server.

The process 100 begins by obtaining (at 110) an array of currently open windows. An open window includes any window that has been instantiated, though the open window need not be displayed on-screen. An open window can be obscured behind other windows that are displayed on-screen. An open window also can be minimized or positioned off-screen. In some embodiments, the array of currently open windows is obtained by issuing one or more API or system calls to the OS or window server of the OS. In many instances, the obtained array is ordered according to the z-order of the windows (i.e., an ordering resembling the order with which the windows were accessed). In other instances, the obtained array is ordered according to the order in which each window was instantiated without regard as to when the windows were last accessed. The array includes pointers or identifiers that are used to programmatically interact with the open windows. For example, the pointers or identifiers can be parameters that are issued as part of an API or system calls which are used to identify which window an API or system call is passing data to, modifying, or obtaining data from. In some embodiments, the obtained array further includes information about the open windows such as a z-order position and last on-screen coordinates. In some other embodiments, such additional information is not included as part of the obtained array and is instead obtained via subsequent API or system calls using the pointers or identifiers.

Once the window array is obtained, the process determines (at 120) its operating mode, and reorders the array accordingly. In some embodiments, the process for the linear switcher includes three modes: "visible", "app", or "all". Each mode provides x-order access to a different set of open windows as explained below. The mode for the linear switcher may be set by the user, OS, or fixed to a default setting.

When in the "app" mode, the process discards (at 130) the windows in the array that are not associated with the frontmost application. In so doing, the app mode of the linear switcher allows users to switch between windows of the frontmost application. Other windows of other applications are not accessible through the linear switcher when in the app mode. To reorder the array in the app mode, the linear switcher identifies the frontmost application by issuing an API or system call to the OS or window server of the OS. The linear switcher then identifies which windows in the obtained array are associated with the identified frontmost application by analyzing the pointers or identifiers of the windows and those of the frontmost application. The process discards windows that are not associated with the frontmost application by removing the pointers or identifiers for those windows from the array. Various applications can have multiple open windows. For example, a document processing application may have multiple open windows, with each window displaying contents of a different document or file.

Figure 2:
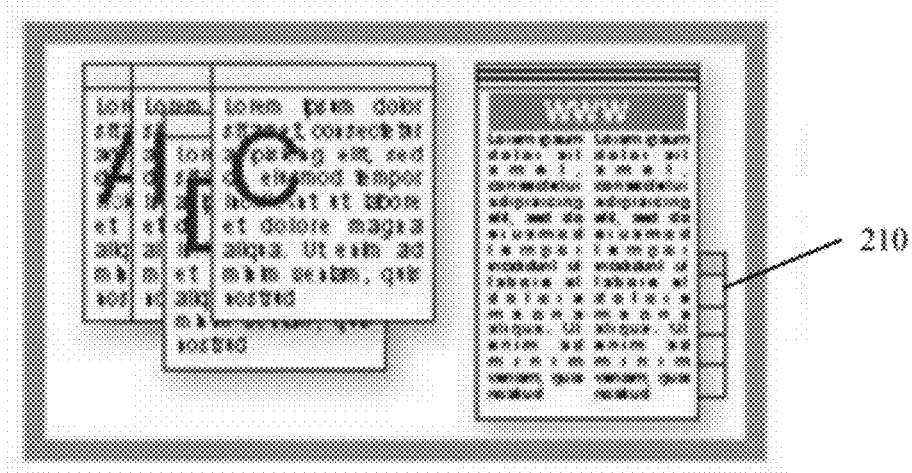
FIG. 2 illustrates a partially obscured window that would be accessible using the linear switcher when in the visible mode.
Figure 3:
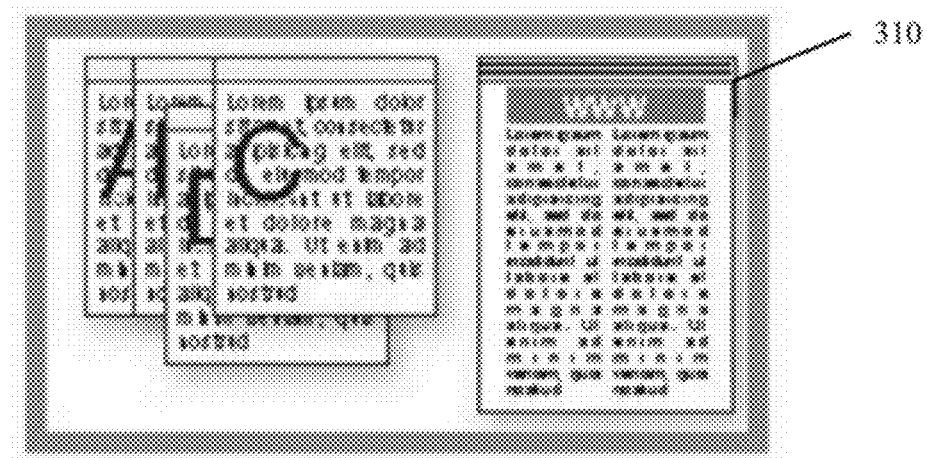
FIG. 3 illustrates moving a first window to the right over a second window such that the second window is wholly obscured by the first window.

When in the "visible" mode, the process reorders the array by discarding (at 140) the windows in the obtained array that are not visible on-screen. Windows that are not visible on-screen include those windows that are fully obscured by one or more other windows. This is accomplished by obtaining the coordinate positions and z-ordering of each of the open windows. Then, the process comparatively determines if one or more of the windows are completely obscured by one or more other windows. In some embodiments, windows that are not visible on-screen may also include windows that have been minimized, hidden, or placed away from the viewable on-screen area. In the visible mode, the linear switcher allows users to switch between those windows that are fully or partially viewable on-screen. FIG. 2 illustrates a partially obscured window 210 that would be accessible using the linear switcher when in the visible mode. FIG. 3 illustrates moving window 310 to the right over window 210 such that window 210 is wholly obscured by window 310. As a result in FIG. 3, the linear switcher cannot be used to switch to window 210 when in the visible mode.

When in the "all" mode, the process does not discard any windows from the array with the exception of hidden or minimized windows in some embodiments. Accordingly, when in the all mode, the linear switcher allows users to switch to any window irrespective of whether it is obscured, or owned by the frontmost application. So long as the window is open, it will be accessible by the linear switcher when in the all mode. In some other embodiments, when in the all mode, the linear switcher allows users to access all open windows including hidden and/or minimized windows.

Next, the process sorts (at 150) the array based on the leftmost x-coordinate position of the remaining windows in the array (i.e., windows that have not been discarded at steps 130-140 above). As noted above, the coordinate positions of the windows may be included within the obtained array from the OS or may be obtained using API or system calls to the OS or window server of the OS using the corresponding pointers or identifiers of the windows. When one window has an identical x-coordinate with another window or when one window has an x-coordinate that is within a specified distance of the x-coordinate for another window, the process selects the window with the largest (vertically uppermost) y-coordinate as the leftmost window of the two and the window with the smallest (vertically lowest) y-coordinate as the rightmost window of the two. This manner of distinguishing between near vertically left-aligned windows is similarly applicable to when three or more windows have x-coordinates within the same specified distance.

Once the array is sorted, some embodiments optionally display window identifiers on-screen based on the leftmost x-coordinate position of each window. As will be described below and illustrated with reference to FIG. 5, these window identifiers aid in better identifying the windows that may be partially or wholly obscured by other windows when using the linear switcher.

The process determines (at 160) an index in the current x-sorted array for the window that is currently frontmost. As an example, a first window in the sorted array is associated with the index 0, a second window in the sorted array is associated with the index 1, and a third window in the sorted array is associated with the index 2. When the third window in this example is frontmost, the determined index is 2.

In some embodiments, steps 110-160 are performed when window positions change based on a resizing of a window, movement of window, opening of a new window, or closing or hiding of an open window as some examples such that the process 100 continually tracks the positions of the windows irrespective of whether a user is switching between windows.

Provided that a user input is issued to switch between windows using the linear switcher, the process determines (at 170) the corresponding direction indication of the user input. When the direction indication is to the right, the process raises (at 180) the index by 1, switches the window to the next window to the right in the sorted array if necessary, and the process ends. When the direction indication is to the left, the process lowers (at 190) the index by 1, switches the window to the next window to the left in the sorted array if necessary, and the process ends. Some embodiments perform limit checking such that switching windows is not necessary when the current frontmost (i.e., selected or active) window is at one limit and the provided directional switch input attempts to exceed that limit. For example, switching is not necessary when the index of the current frontmost window is at an end of the array and the index cannot be raised or lowered further. In some other embodiments, the array is circular and the index will cycle from one end of the array to the other end allowing the user to switch from a window at one end of the screen to a window at the opposite end of the screen. Finally, if the newly raised window does not belong to the current frontmost application, the linear switcher will cause the owner of the newly raised window to become frontmost.

Figure 4:
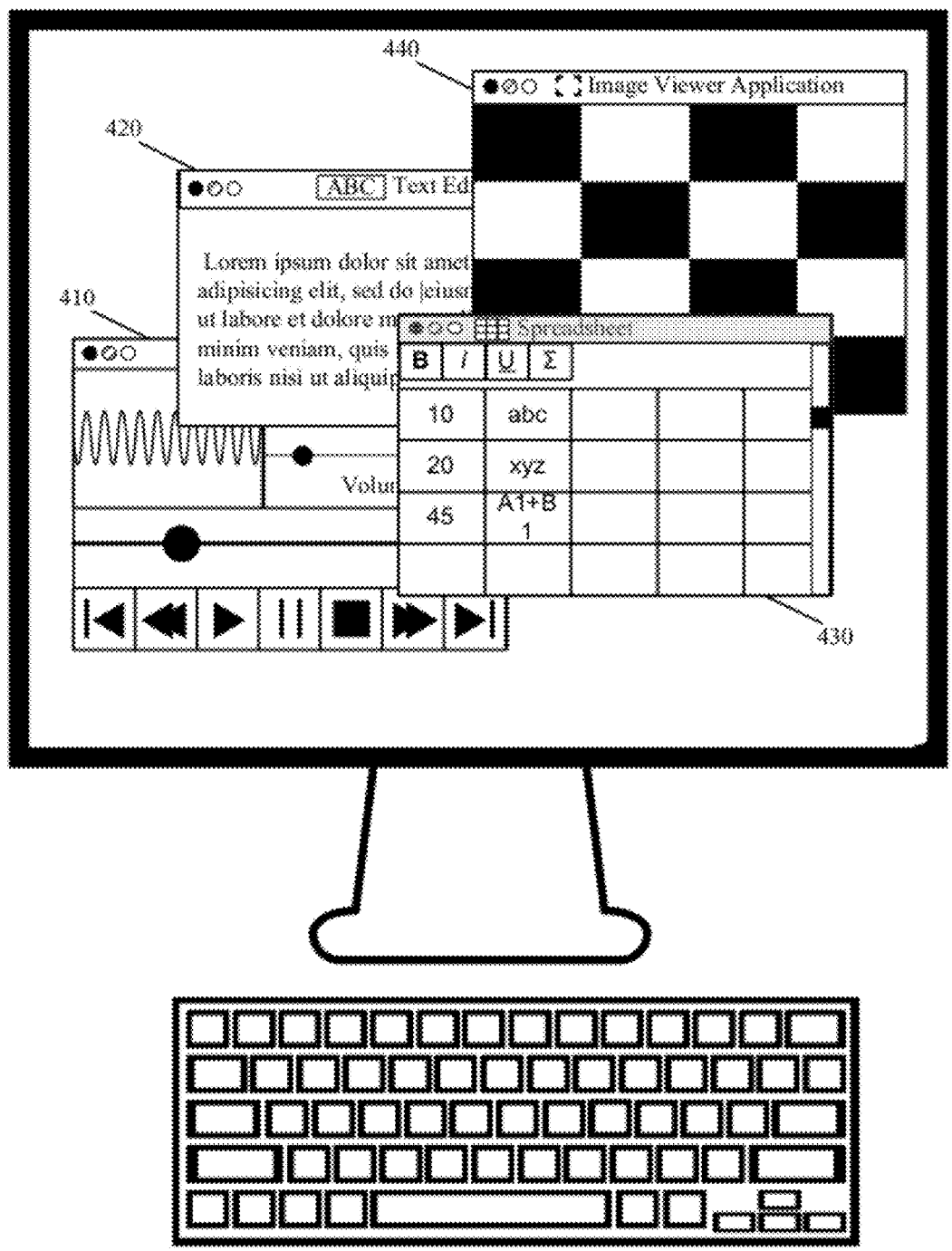
FIG. 4 illustrates a set of overlapping windows with a particular window in the set of overlapping windows being frontmost.
Figure 5:
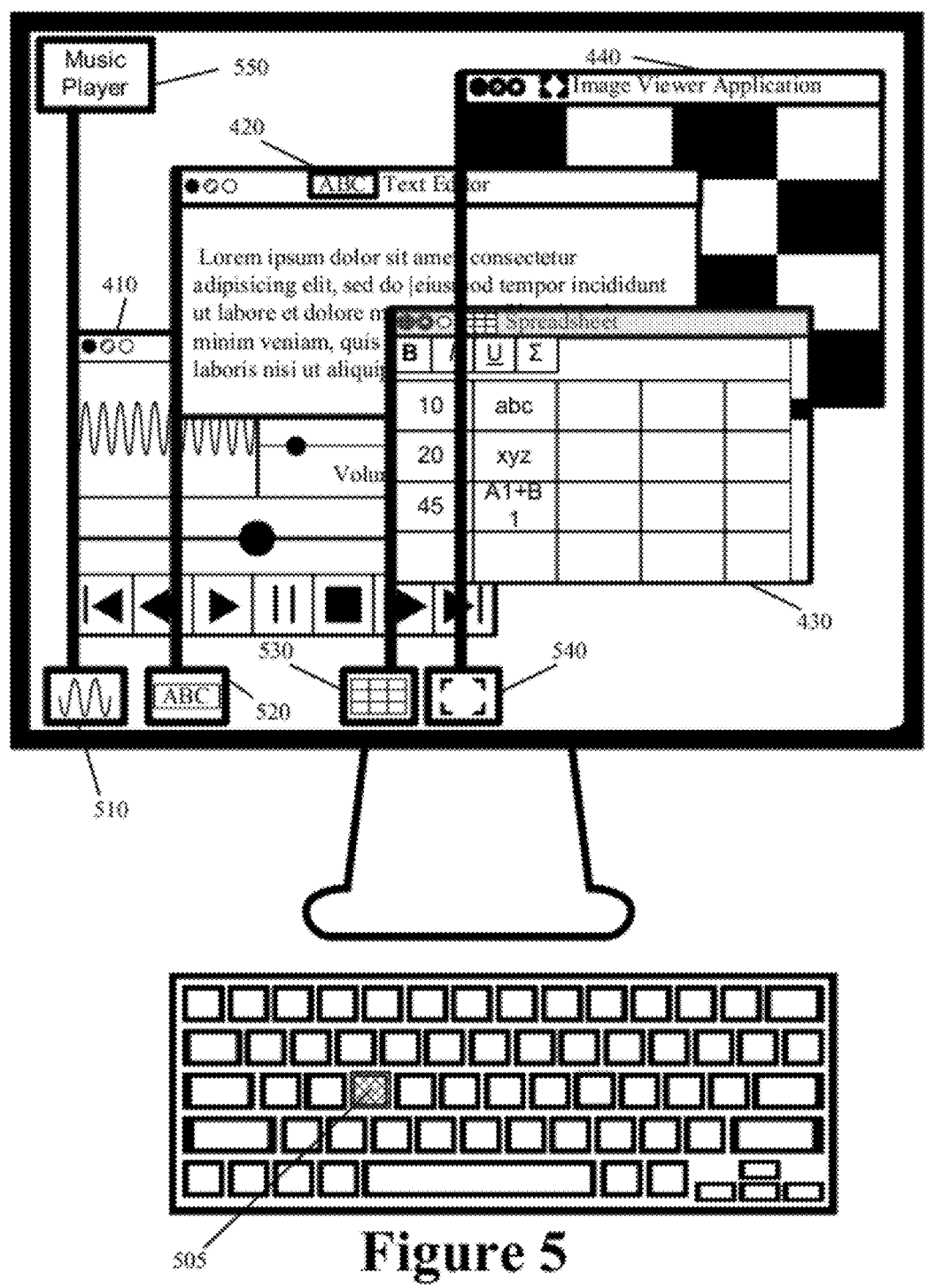
FIG. 5 illustrates invoking the linear switcher of some embodiments with a press and hold of a first keyboard key.
Figure 6:
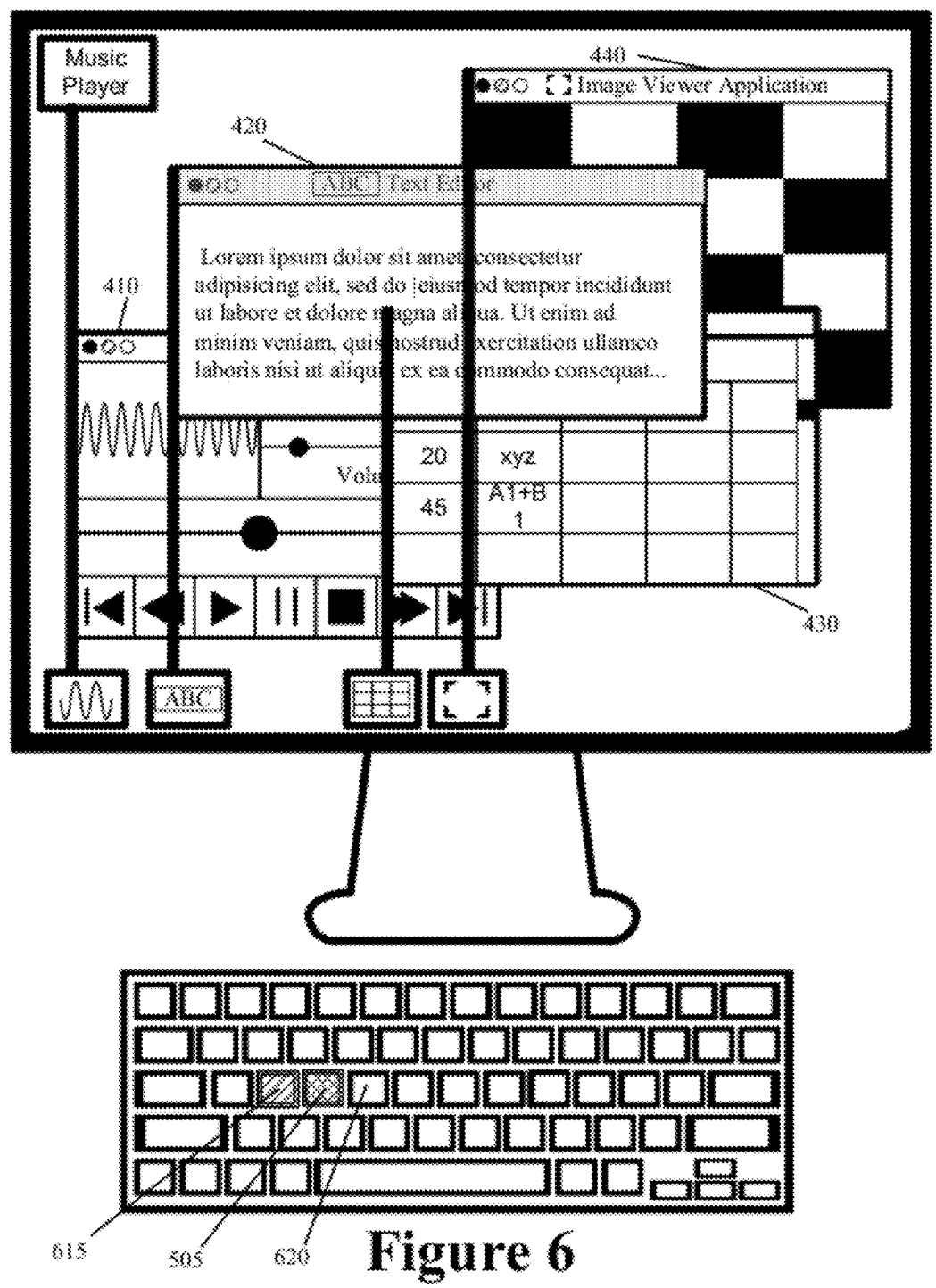
FIG. 6 illustrates using the linear switcher of some embodiments to select a window to the left of the frontmost window.

FIGS. 4-6 illustrate operation of the linear switcher in accordance with some embodiments. As shown in FIG. 4, a GUI displays overlapping windows 410, 420, 430, and 440 with the window 430 being frontmost. FIG. 5 illustrates invoking the linear switcher of some embodiments with a press and hold of a first keyboard key 505 with the hold being retained beyond some specified duration. When the linear switcher is invoked, window identifiers 510, 520, 530, and 540 are presented on-screen to identify each of the windows 410, 420, 430, and 440.

The window identifiers 510-540 assist in identifying those windows that are partially or wholly obscured in the GUI by other windows. As shown, the window identifiers 510-540 extend from the leftmost x-coordinate of each window and each identifier 510-540 includes a graphical symbol or icon that identifies the window from which the identifier extends. In some embodiments, a window identifier is complimented with an optional textual identifier. The textual identifier provides a short textual description of the window for additional identification. For example, textual identifier 550 is shown for the window 410. The textual identifier 550 extends upward from the leftmost x-coordinate of the window 410. In some embodiments, textual identifiers are shown instead of or in addition to some or all of the window identifiers. In some embodiments, the short textual description is included in or instead of the graphical symbols or icons of the window identifiers 510-540. Symbols, icons, or text for the window identifiers and/or textual identifiers are obtained in some embodiments using the window pointers or identifiers in conjunction with various API or system calls that retrieve the symbols, icons, or text, such as the title of the window. In some embodiments, the title of the window or other text is spoken using the OS text-to-speech capabilities, in response to a specific key or keys being pressed and/or tapped by the user.

In some embodiments when a window is maximized, the linear switcher temporarily reduces the size of the maximized window so that the x-order position of that window and other windows can be seen on-screen, in addition to the identifiers for the windows. In some embodiments when a window is minimized, the linear switcher temporarily restores the minimized window on-screen in order to display the corresponding identifiers and the x-order position of that window. Alternatively, a window identifier may be presented from the bottom of the screen for a minimized window based on the leftmost x-coordinate for that window when it was last displayed on-screen.

FIG. 6 illustrates using the linear switcher of some embodiments to select a window to the left of the frontmost window. In this figure, the user continues to hold down the first keyboard key 505 to invoke the linear switcher. Additionally, the user taps a second keyboard key 615 to select window 420 that is to left of window 430 to become frontmost. Each tap of the second keyboard key 615 while holding down the first keyboard key 505 selects the subsequent adjacent window to the left. To switch to a window to the right, a third keyboard key, such as keyboard key 620, is tapped while holding down the first keyboard key 505. When the first keyboard key 505 is released, the currently selected window (i.e., window 420 in FIG. 6) becomes frontmost, and the window and textual identifiers and other visual aids of the linear switcher fade out. Though the first, second, and third keyboard keys are shown in the figures as specific keyboard keys, some embodiments permit the user to set which keys invoke the above-described functionality of the first, second, and third keyboard keys. The particular keyboard keys in the figures above were selected for exemplary purposes only, since any keyboard keys can be used to implement the above-described functionality. The ability to invoke the linear switcher with a press and hold of any key may be provided using a MOD operational mode of the Keyboard Enhanced Interface (KEI) that is described in the non-provisional U.S. patent application Ser. No. 13/423,204 entitled "Input Device Enhanced Interface" and the U.S. provisional patent application 61/465,308 entitled "Keyboard Enhanced Interface". Specifically, the linear switcher may be invoked by pressing and holding (beyond a specified duration) a particular keyboard key that provides access to the linear switcher functionality, and then tapping another one or more subsequent keys (while continuing to hold the first keyboard key) to switch to the window that is to the right or left of current selected window.

Additionally, various touches and gestures may be used to invoke and perform various functions within the linear switcher. Such touches and gestures such as holds, slides, taps, and flicks may be issued on any touch sensitive surface such as a touch sensitive screen, trackpad, touch sensitive buttons, or touch sensitive frame of a device, as well as any other presence and motion sensing apparatus. For example, in some touch-enabled embodiments of the linear switcher, a four-finger horizontal back and forth slide invokes the linear switcher, causing the application icons to be displayed as the menubar area fades, and window identifier icons and other visual cues appear. This provides a visual indication to the user that the linear switcher mode is active. A subsequent single-finger left flick causes the liner switcher to select the window to the left of the current frontmost window, and a single-finger right flick selects the window to the right of the current frontmost window. A single-finger upward flick selects the previously described all windows mode, and a single-finger downward flick selects the previously described app windows mode. A single finger back and forth slide or oscillation causes the name of the frontmost window to be spoken utilizing the text-to-speech capabilities of the OS. Two-finger slides move the frontmost window in proportion to the movement of the slide, and two-finger flicks also move the frontmost window, but snap to left/center/right and top/middle/bottom positions on each screen as further described below. Three-finger slides resize the frontmost window such that the lower-right coordinate of the window is modified in proportion to the movement of the slide. A four-finger upward flick exits the linear switcher mode with a corresponding animation of the application icons sliding off the top of the screen and the menubar fading back in. In some embodiments, graphics and/or animations which depict various touch options are presented to the user after the linear switcher has been invoked by touch, and no subsequent valid touches are perceived beyond a period of time. Additionally or alternatively, audible cues and/instructions are provided as well, for example, after touch activating the linear switcher, a two finger touch speaks "move" to indicate that slides will move the frontmost window. Similarly, a three finger touch speaks "resize" and a one-finger touch speaks "select", a four finger touch speaks "flick up to exit", and so on. It should be clear to one skilled in the art that different touches and gestures may be mapped to alternate linear switching functionality, and such embodiments should be regarded within the scope of the present invention. Additional description for invoking output actions, such as those of the linear switcher, using touches and gestures, holds, taps, slides, and flicks is described in U.S. non-provisional patent application Ser. No. 13/423,212 entitled "Touch Enhanced Interface" and in U.S. provisional patent application 61/465,309 entitled "Touch Enhanced Interface".

Figure 7:
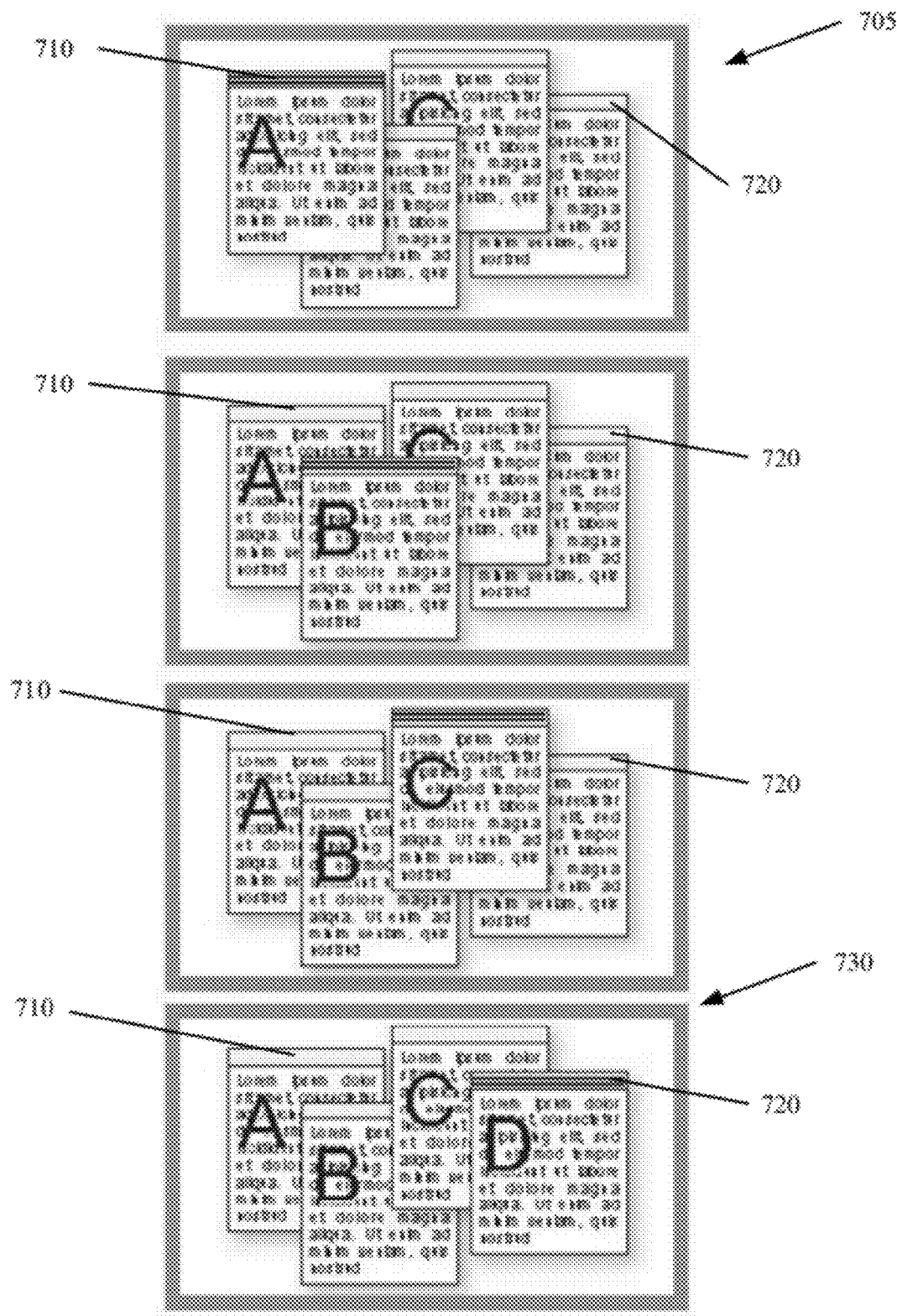
FIG. 7 illustrates using the linear switching to switch three windows to the right in accordance with some embodiments.

In some embodiments, audible notifications are presented when a new window is selected or made frontmost using the linear switcher. The audible notifications may be presented in addition to or instead of the various identifiers described above. The audible notification may read a title or description of the currently selected window. Additionally or alternatively, the audible notifications may use various sounds with a musical pitch to indicate where in the sorted array of windows the current selected window is located. For example, in some embodiments a low pitched sound is used to indicate a leftmost window, and for every selection to the right of the leftmost window, the pitch for the sound is incrementally raised by, for example, one scale tone. Audible notifications may also be used to notify the user when a leftmost window or a rightmost window has been reached. For example in FIG. 7, the leftmost window 710 is initially selected at 705 and the linear switcher is used to switch three windows to the right and select window 720. However, once window 720 is selected at 730 and the user attempts to switch to the right again, the linear switcher provides an audible notification to the user to indicate that a rightmost limit has been reached and no further selections may be made in that direction.

In some embodiments, a visual slider is presented with graphical tick marks to indicate a selected window and a number of windows to the right and to the left of the selected window. Each tick mark represents a window that may be selected when using the linear switcher. Accordingly, the visual slider includes more tick marks when more windows are open and fewer tick marks when fewer windows are open.

Figure 8:
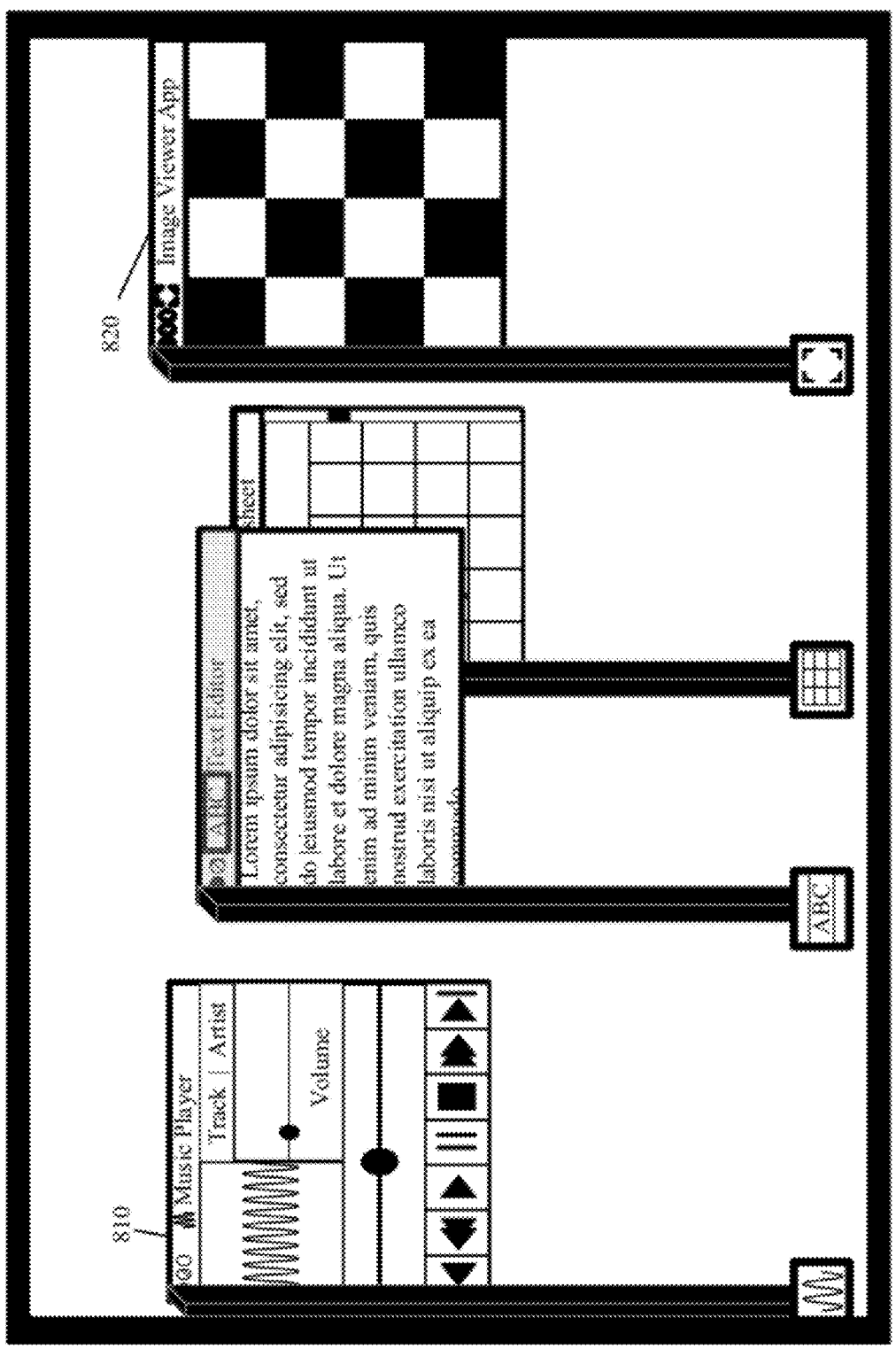
FIG. 8 illustrates the snapping functionality of the linear switcher based on the prior screen layout of FIG. 6.

In some embodiments, the linear switcher is enhanced to better identify the position of the windows on-screen when the linear switcher is in use. Specifically, rather than display window identifiers from the current leftmost x-coordinate of each window, some embodiments snap the leftmost window to the leftmost side of the screen and snap the rightmost window to the rightmost side of the screen with intermediary windows arranged in a staggered configuration across the center of the screen. FIG. 8 illustrates the snapping functionality of the linear switcher based on the prior screen layout of FIG. 6. When several windows are open, some such embodiments snap two or more windows to the leftmost and rightmost sides of the screen (see windows 810 and 820) in a staggered configuration such that there is an equal distribution of windows at the leftmost, center, and rightmost positions of the screen.

Figure 9:
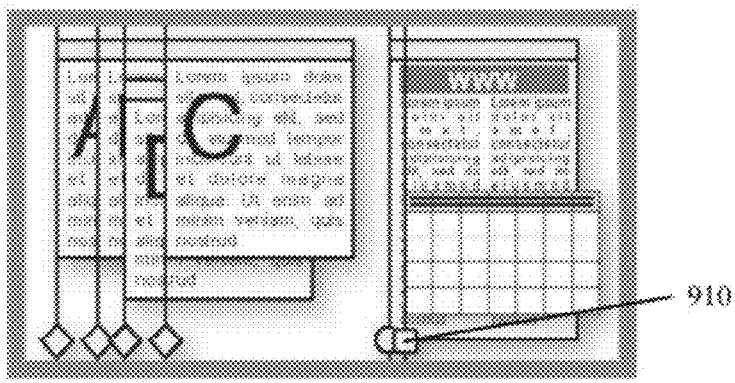
FIG. 9 illustrates a first set of window identifiers in accordance with some embodiments.

Other embodiments of the linear switcher in accordance with those described above are presented with reference to FIGS. 9-12 below. FIG. 9 illustrates a first set of window identifiers in accordance with some embodiments. As before, the window identifiers extend from the leftmost x-coordinate position of each window. Each window identifier is graphically represented by a symbol with the symbol of the frontmost application 910 being distinguishable from the other symbols. In some embodiments, the symbols include application icons. In some embodiments, some of the symbols are badges that convey status information about the corresponding window. For example, a window identifier that extends from an email application window can be used to display a badge for identifying the number of unread emails.

Figure 10:
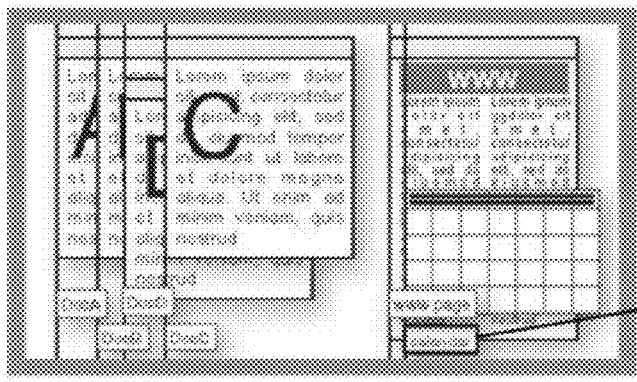
FIG. 10 illustrates a second set of window identifiers in accordance with some embodiments.

FIG. 10 illustrates a second set of window identifiers in accordance with some embodiments. In FIG. 10, the window identifiers include text for identifying the title of the corresponding window, the title of the application that is accessible using the corresponding window, the title of the file that is open in the corresponding window, or a website URL that is displayed in the corresponding window. Additionally, the window identifier 1010 for the frontmost application is highlighted, bolded, or otherwise graphically distinguished from the other window identifiers. In some embodiments, the frontmost window itself may be highlighted by some means such as a brightly colored semi-transparent border superimposed on the window bounds.

Figure 11A:
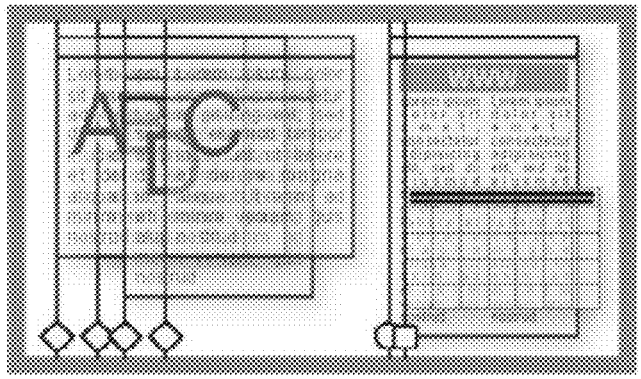
FIG. 11a illustrates a graphical effect performed by the linear switcher to the on-screen windows to better identify the contents of each window.

FIG. 11a illustrates a graphical effect performed by the linear switcher to the on-screen windows to better identify the contents of each window. Specifically, the linear switcher makes each on-screen window semi-transparent so that the contents of the windows can be seen even when the windows are wholly or partially obscured by other windows. In some embodiments, the z-ordering of the displayed windows is changed to reflect a left-to-right or x-ordering of the windows. This is done in order to reveal or partially reveal windows that would otherwise be obscured if the current z-ordering were to be retained. When the user exits the linear switcher mode or the specific display mode of the linear switcher, the z-ordering is restored. It should be noted that in some embodiments, combinations and permutations of various graphical effect techniques are utilized. For example, when viewing in partial transparency mode, the windows also are reordered in the z-plane to a left-to-right ordering, and transparency and z-ordering are restored when the display mode is exited.

Figure 11B:
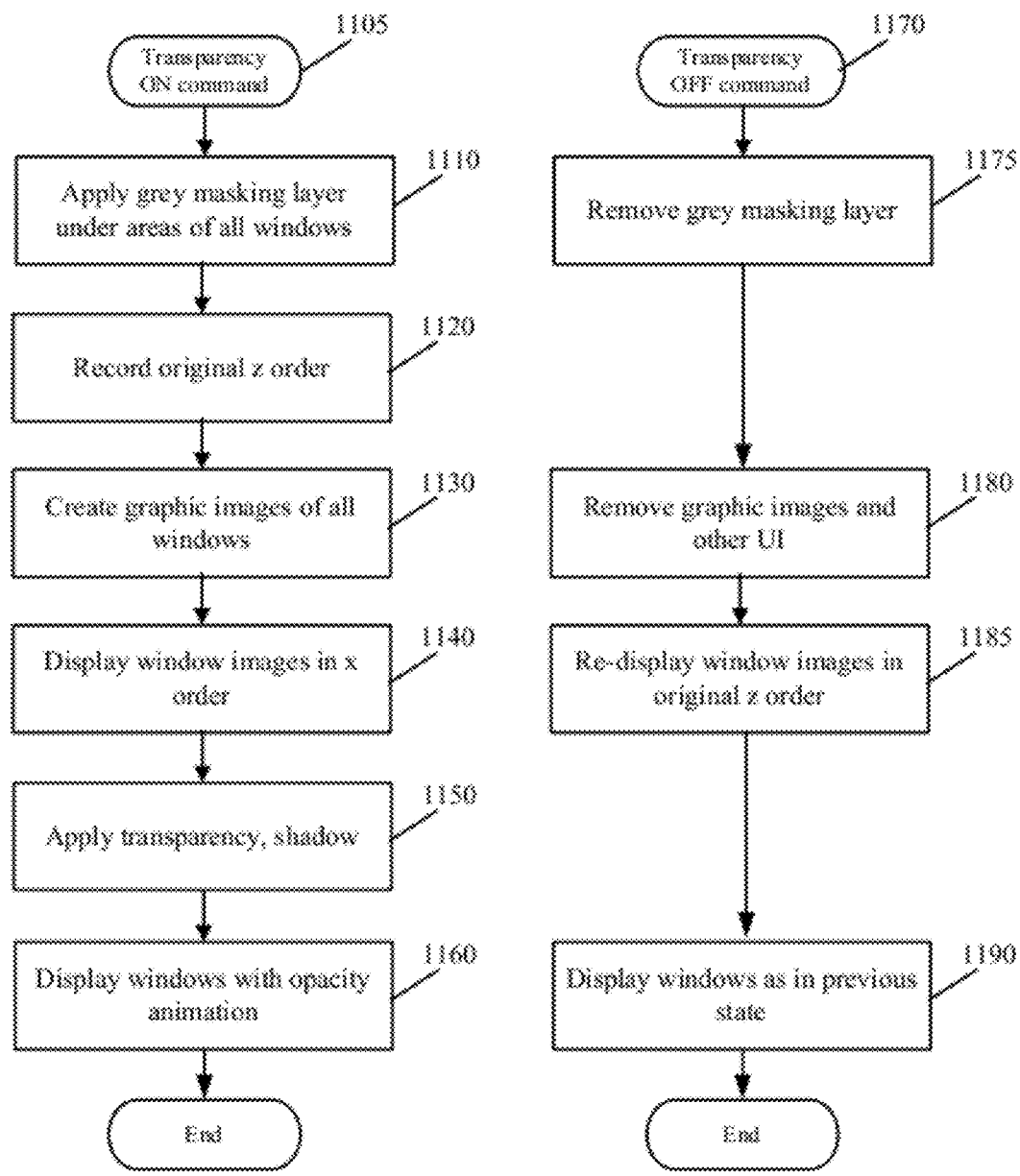
FIG. 11b presents processes utilized to create and disable the window transparency effect in some embodiments.

In some embodiments, the transparency can be turned on and off by holding down or tapping a specific key while the linear switcher is active. FIG. 11b presents processes utilized to enable and disable the window transparency effect in some embodiments. The linear switcher is normally already invoked when the transparency ON command is received at 1105. Therefore, various visual elements such as window highlighting are displayed on screen. Some such elements fade out so the windows are not obstructed. At 1110, an opaque grey masking layer is placed beneath each window which matches each window size exactly. The process records (at 1120) the z order of the windows for later recall. The process creates (at 1130) a graphic image of each window so that the transparency of the image can be controlled. The newly created images are then displayed (at 1140) in x-order atop the grey opaque layer. By stacking in x-order, windows are more consistently visible. Then, at 1150, transparency is applied to the windows, and shadow and other effects are applied. Finally, the process starts (at 1160) a cyclical animation process, which slightly varies the transparency of the windows to further aid the user in discerning the contents of each window. When the transparency OFF command is received at 1170, the grey masking layers are removed (at 1175), the window graphic images are removed (at 1180), and the original windows are made (at 1185) visible again in the original z order. The process ends at 1190 with the initial graphic elements of the linear switcher restored.

Figure 12:
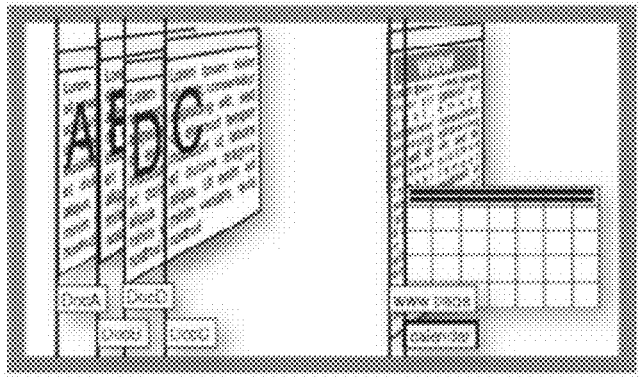
FIG. 12 illustrates a different graphical effect performed by the linear switcher of some embodiments which allow the user to better identify the contents of each window.

FIG. 12 illustrates a different graphical effect performed by the linear switcher of some embodiments which allow the user to better identify the contents of each window. In this figure, the linear switcher performs a three dimensional animation effect whereby each window is rotated about its leftmost x-coordinate and into perspective space, so that a portion of an obscured window is rendered visible on-screen. The frontmost window does not receive this animated effect, and is therefore readily discernible. As the user switches windows left and right, the new frontmost window swings forward to the normal state and the old frontmost window swings back into perspective space.

The linear switcher may perform other visual effects such as fading the desktop or background to black. This allows the user to more easily identify the open windows without the background distraction of desktop images or the like. In some embodiments, the linear switcher utilizes shadow effects on the windows to better distinguish the windows from one another.

Figure 13:
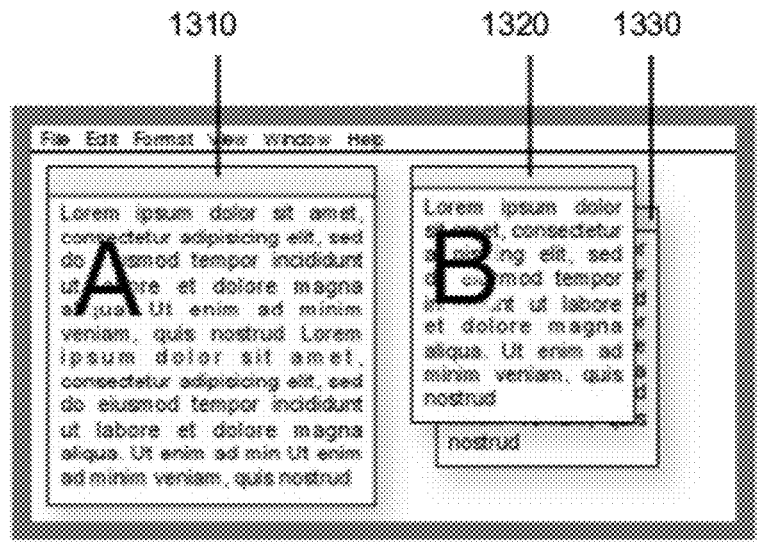
FIG. 13 depicts a typical workflow situation wherein the user is composing a first text document while referring to a second document.
Figure 14:
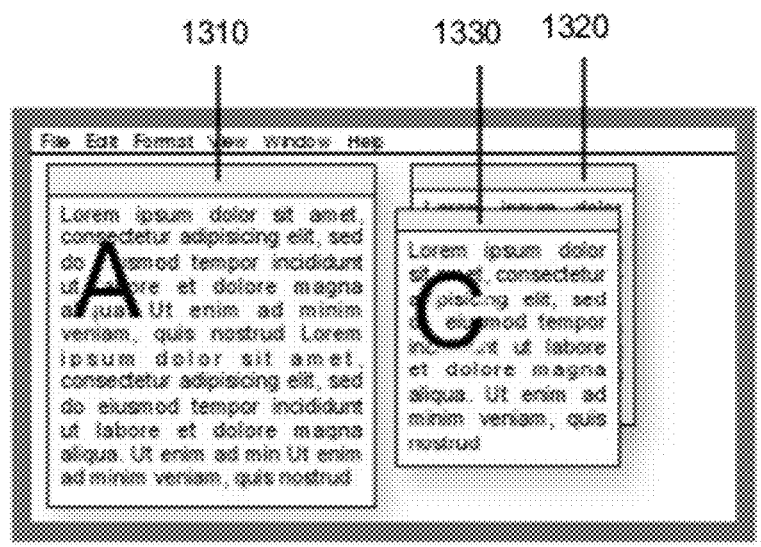
FIG. 14 illustrates modifying the workflow orientation of FIG. 13.

Some embodiments further provide methods with which to interact with open windows in order to set or adjust the sizing and positioning of the windows on-screen. Some such methods include providing keyboard shortcuts which allow users to move and resize windows using various keys of the key-based input device. This allows users the ability to customize the arrangement of windows on-screen using discrete commands. By providing the ability to rearrange the windows on-screen, the order with which the linear switcher selects windows can be visually and intuitively set according to the task at hand, and allows for quicker switching between specific windows using muscle memory. For example, FIG. 13 depicts a typical workflow situation wherein the user is composing a text document 1310 while referring to document 1320. The user may use the linear switcher to switch right and left to, for instance, copy text from document 1320 to document 1310. When the user later wishes to refer primarily to document 1330, the user moves document 1330 slightly to the left of window 1320 as shown in FIG. 14. In so doing, the same right-left switching can now be used to alternate between accessing documents 1310 and 1330. Thus, the least number of key actions may be utilized to access the most frequently accessed documents, and muscle memory is automatically formed, eventually making such selection effortless. Furthermore, there is never a doubt as to the access ordering of the windows, because the order is always reflected horizontally across the screen(s), and therefore the number and direction of keystrokes required to access a specific window is always readily apparent and intuitive. When compared against existing art, the present invention effectively removes levels of abstraction, thus reducing the cognitive load and associated memory requirements of the user. Also when compared against existing art in terms of a "previous application shortcut", the present invention differs in that switching occurs by window, rather than by application. Furthermore, some embodiments maintain a history of frontmost windows such that subsequent invocations of a "previous" output action brings forward such windows, rather than simply alternating between the last two frontmost applications or documents.

Figure 15:
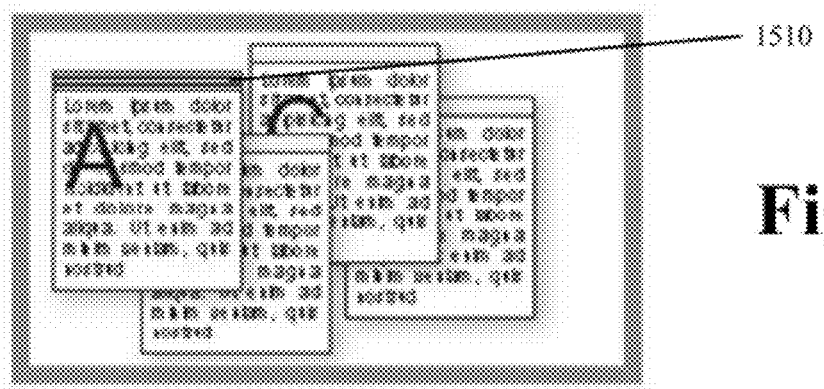
FIGS. 15-18 illustrate using the move functionality in conjunction with the linear switcher in accordance with some embodiments
Figure 16:
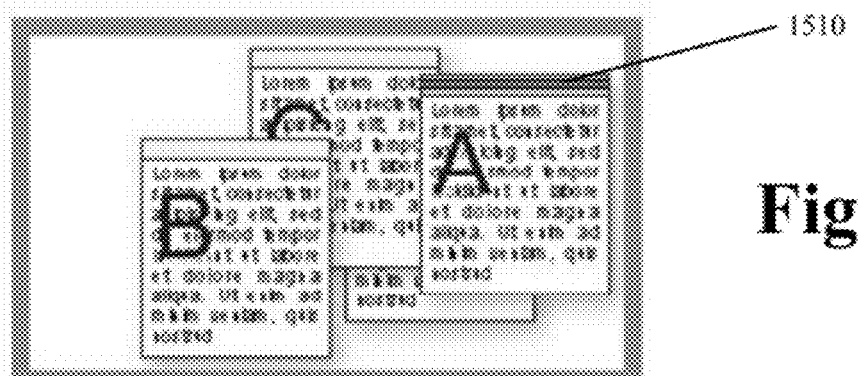
Figure 17:
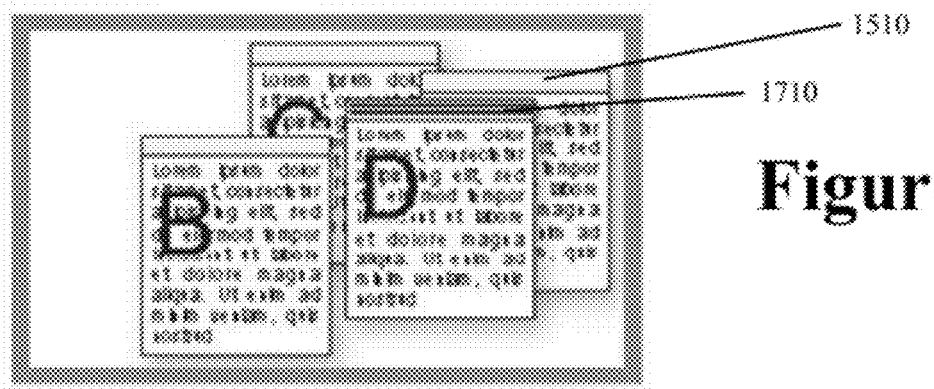
Figure 18:
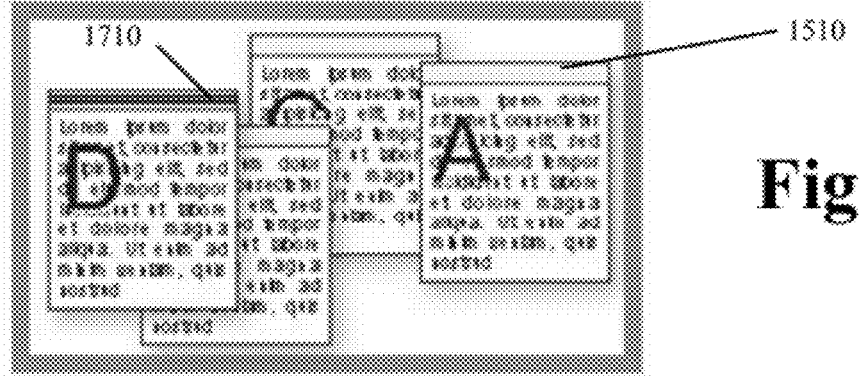

In some embodiments, once the linear switcher is invoked as described above, the "I", "K", "J", and "L" keys can be used to move the currently selected window up, down, left, and right. In some embodiments, different and/or additional keys can be used such that move operations apply to multiple on-screen windows. FIGS. 15-18 illustrate using the move functionality in conjunction with the linear switcher in accordance with some embodiments. In FIG. 15, window 1510 is frontmost and selected in the linear switcher. In FIG. 16, window 1510 is moved to a rightmost position on-screen using one or more specified keyboard keys. As a result of the move, the linear switcher updates its x-ordering of the windows. Such updating of the x-ordering may occur when the linear switcher detects that the moving of the window has ceased. Next, the user utilizes the appropriate key or keys to switch one window to the left. From the updated x-ordering as a result of the previous window movement, the linear switcher identifies that window 1710 is now the next window to the left of selected window 1510, and, as shown in FIG. 17, the linear switcher raises window 1710 that is to the left of the previously selected window 1510. Once window 1710 is frontmost, the keyboard keys can be used to adjust the on-screen position of that window 1710 to the left as shown in FIG. 18. Accordingly, the user can customize the ordering of the linear switcher such that the most commonly used windows are adjacent to one another in an ordering that is easy for the user to access and visualize on-screen.

In some embodiments, the move functionality is enhanced to allow for multiple windows to be simultaneously moved. In some such embodiments, a different or additional keys are pressed or tapped to move, for instance, all open or on-screen windows of the frontmost application. In this and other such cases, additional on-screen graphics assist the user in discovering and utilizing enhanced features of the linear switcher.

In some embodiments, the window move functionality is enhanced with a snap feature whereby windows are automatically positioned exactly at the left edge of the screen, the center of the screen, or the right edge of the screen for horizontal movement, or the top of the screen, middle of the screen, and bottom of the screen for vertical window movement. In one such embodiment, pressing an additional key such as the spacebar causes the next directional movement to snap to the next closest snap position. Furthermore, when multiple screens are utilized, the three snap positions per axis are available for each such monitor. This allows the user to quickly move a window to a corner, or to a different monitor.

Some embodiments further provide a stacking capability whereby a particular keyboard key press automatically stacks windows belonging to the same application behind the window that is selected or frontmost. To do so, the coordinate positions of each non-frontmost window are adjusted to be offset from the coordinate positions of the frontmost window. A staggering effect is accomplished by adjusting the offset amount for each window that is stacked behind the frontmost window. Options are provided to offset on the x-axis, the y-axis or both. Further options allow the stacking function to make all windows the same size, or retain the current sizes and only move the windows to the stacked positions. Some embodiments provide stacking starting from the position of the leftmost window of the current application, which may or may not be the frontmost window.

Similarly to the window move functionality; some embodiments also provide a means to resize windows. In one such embodiment, the height and width of the frontmost window may be changed by utilizing various keyboard keys. Specifically, when the linear switcher is activated as described above, some embodiments provide designated keys to increase and decrease the width of the frontmost window, and two other designated keys to increase or decrease the height of the frontmost window. Tapping a designated resize key makes a single incremental change whereas holding down the designated resize key smoothly changes the dimension until the key is released. Also, when the linear switcher is active, some embodiments provide additional on-screen graphics which add further functionality that can be accessed by keyboard, pointing device or touch. Such functionality includes window positioning, snapping, resizing, transparency, and other settings, as well as informational data such as key focus, modification history, file path and status, etc.

Figure 19:
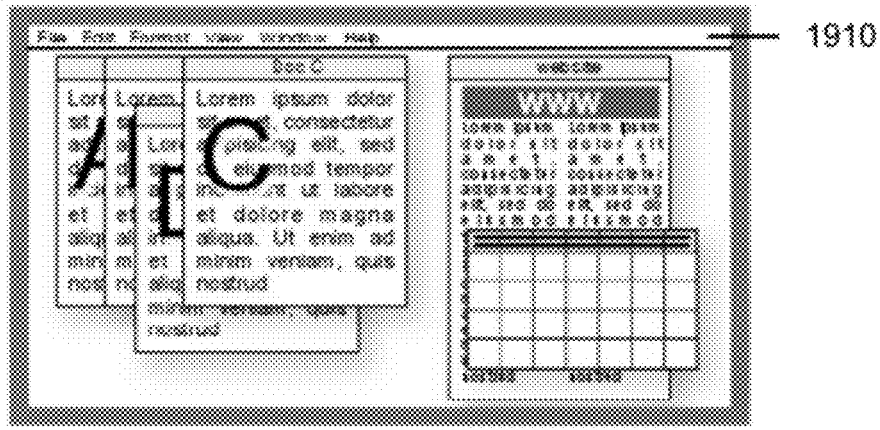
FIG. 19 shows a typical screen layout in accordance with an embodiment implemented on an OS which includes a menubar area at the top of the screen.
Figure 20:
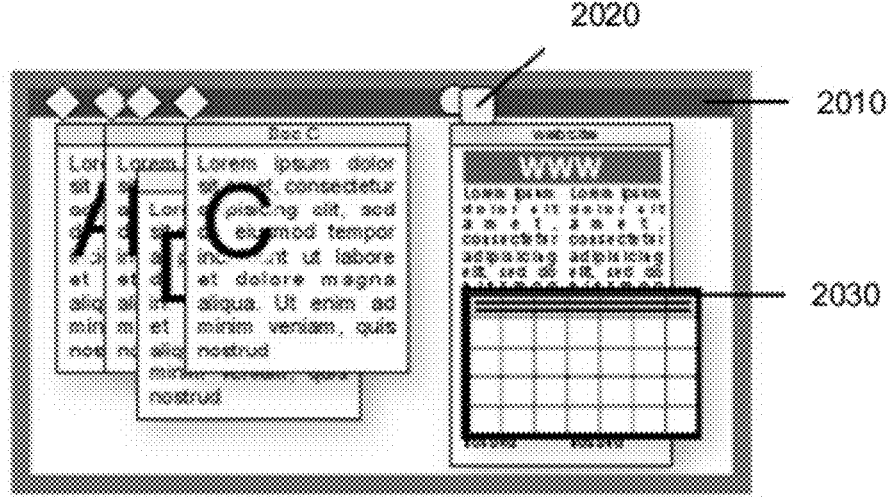
FIG. 20 shows an embodiment which fades the menubar area to black, and then displays application icons in the menubar area.

FIG. 19 shows a typical screen layout in accordance with an embodiment implemented on an OS which includes a menubar area 1910 at the top of the screen. After invoking the linear switcher in a manner set forth above, FIG. 20 shows an embodiment which fades the menubar area 2010, and then displays application icons in the menubar area 2010 corresponding to the window below at the leftmost coordinate of that window. The single icon 2020 which corresponds with the frontmost window has an application icon that animates to a larger size which extends somewhat beyond the bounds of the menubar area 2010. To further draw the user's attention to the frontmost window, a distinctive border 2030 just beyond the bounds of the frontmost window animates into view. As the user selects a window to the right or left in a manner as described above, the new single icon corresponding with the new frontmost window is animated to the larger size, and the window border highlighting also shifts to the new frontmost window's bounds. When the user exits the linear switching mode by releasing the invocation key, issuing a gesture, or some other method, all application icons in the menubar area 2010 slide up and off the screen, and the normal menubar graphics 1910 fade back into view.

In some embodiments, a "stagger" function provides an intuitive manner by which the user can identify each of the on-screen windows. Particularly, when the user employs many windows and windows overlap or obscure underlying windows, the stagger function becomes a valuable tool which exposes all windows by altering the y-axis coordinate while retaining the x-axis coordinate, that is, sliding the windows up and down while horizontally locked. This allows the title bar and possibly further content of the screen to become visible to the user. In some cases, windows will extend beyond the lower bounds of the screen, and thus be hidden from view. In some embodiments, the z-ordering of the windows determines the vertical ordering for the windows when the stagger function is invoked, and in other embodiments, the x-ordering determines the vertical ordering for the windows when the stagger function is invoked.

In some embodiments, the stagger function further aids the user in identifying each of the on-screen windows by displaying icons at the top of the screen to identify each of the windows and by superimposing vertical lines down from the icons to the corresponding windows below. The vertical line representing the frontmost window is highlighted, and the corresponding icon identifying the frontmost window above is enlarged. As the user switches left and right, the icon and vertical line highlighting tracks the selected window. When the stagger function is exited, the selected window is raised frontmost and application is switched if necessary. The windows animate back their previous positions and the vertical lines slide up and out of view.

Figure 21A:
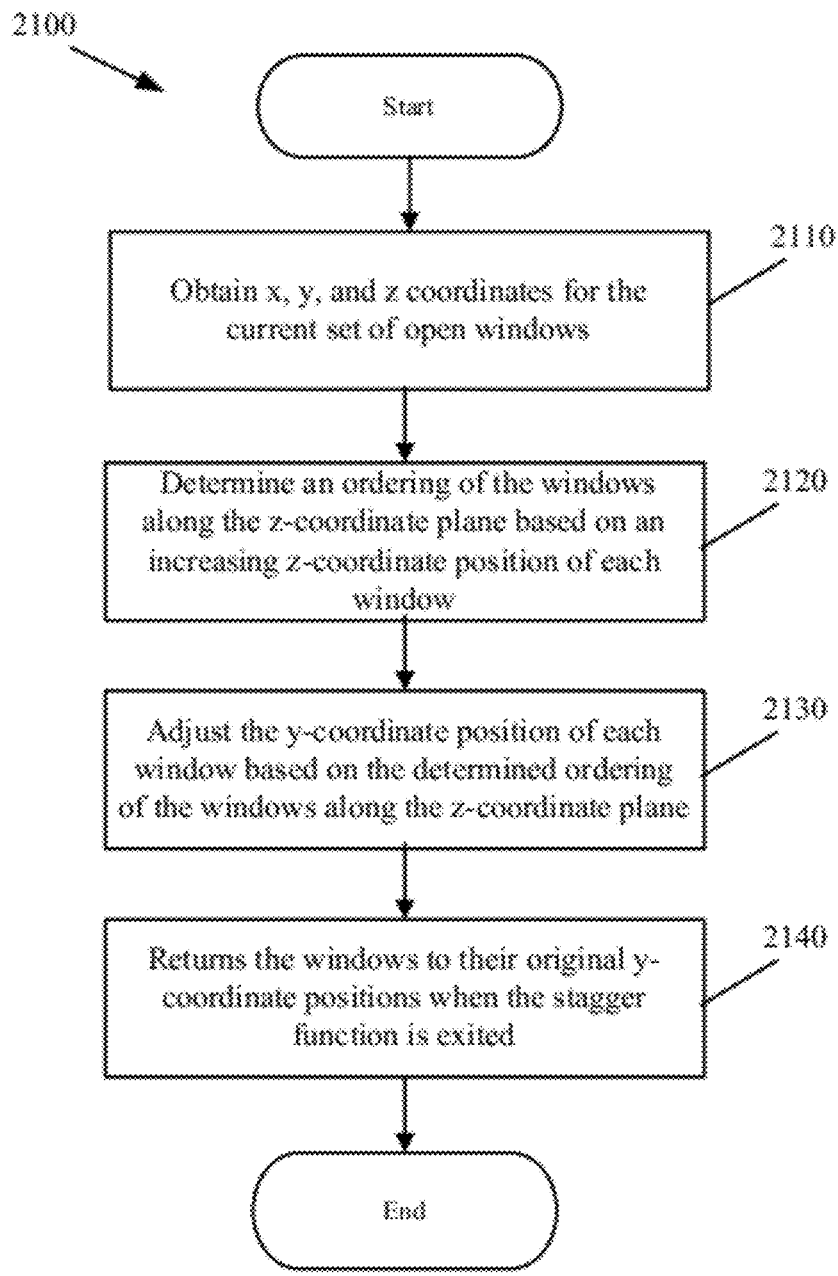
FIG. 21a presents a process with which the linear switcher produces a staggered presentation of the windows in accordance with some embodiments.

FIG. 21a presents a process 2100 whereby the linear switcher produces a staggered presentation of the windows in accordance with some embodiments. The process 2100 begins when at least one keyboard key is pressed to invoke the stagger function of the linear switcher. The process obtains (at 2110) the x, y, and z coordinates for the current set of open windows. These coordinates are typically maintained by the OS or GUI and can be obtained using various system or API calls. As before, the x and y coordinates identify the position of a window in the GUI, and the z-coordinate identifies the stacking depth of the window relative to other windows. A first window with a higher depth will obscure a second window with a lower depth along the z-coordinate plane when the first window has some x-y coordinate area that overlaps with the x-y coordinate area of the second window. Typically, the z-coordinate plane ordering of the windows is determined based on the order in which the windows were last accessed such that the current frontmost window will not be obscured by any other windows and has the highest z-coordinate depth.

The process determines (at 2120) an ordering of the windows along the z-coordinate plane based on an increasing z-coordinate position of each window. Next, the process adjusts (at 2130) the y-coordinate position of each window based on the determined ordering of the windows along the z-coordinate plane. This adjustment to the y-coordinate positions of the windows produces the staggered effect that better displays the windows on-screen. Specifically, the frontmost window having the highest z-coordinate depth is moved towards the bottom of the screen to have the lowest y-coordinate position, the window with the next highest z-coordinate depth (i.e., the last accessed window) is moved to a y-coordinate position that is above the frontmost window but that is below all other windows, and so on. It should be noted that the staggered effect does not adjust the x-coordinate or the z-coordinate positions of the windows. This is so the user can use the stagger function in conjunction with the switching functionality, wherein the stagger function allows the user to better identify the x-axis ordering of the windows when some windows overlap with other windows thereby obscuring some of the windows from view. The process returns (at 2140) the windows to their original y-coordinate positions when the stagger function is exited as a result of the user releasing the keyboard key that is used to invoke the stagger function.

It should be noted that touch gestures as well as pointer gestures (such as oscillation) as well as other pointer input (such as clicking on linear switcher overlay elements) and other pointer events (such as right-click or scroll wheel events) can be utilized in combination or instead of keyboard-based input to control the linear switcher of some embodiments. For example, the user may invoke the linear switcher by pressing and holding a keyboard key, and then use their other hand on a pointing device, such as a mouse, to operate controls that appear in response to the linear switcher being invoked. For the sake of brevity and clarity, keyboard input is used in this and other specific disclosures herein, though other control mechanisms and combinations thereof are incorporated in some embodiments.

Figure 21B:
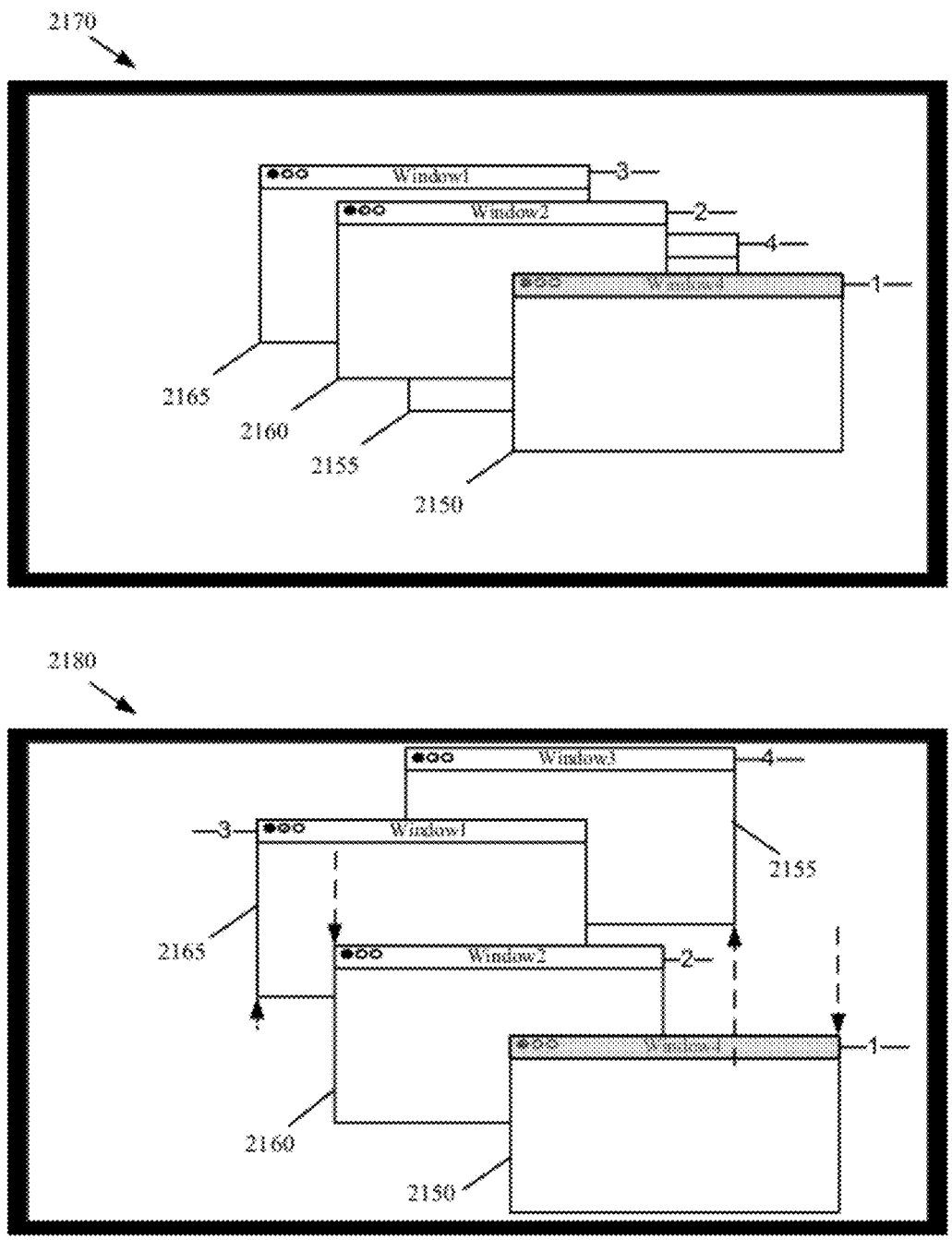
FIG. 21b illustrates operation of the stagger function in accordance with some embodiments.

FIG. 21b illustrates operation of the stagger function in accordance with some embodiments. This figure illustrates four windows 2150, 2155, 2160, and 2165 before invoking the stagger function at 2170 and the staggered repositioning of the four windows 2150-2165 after invoking the stagger function at 2180.

At 2170, each of the windows 2150-2165 is shown with a number corresponding to the window's z-coordinate depth. Window 2150 is frontmost and is therefore shown with the number 1 to indicate that it has the highest z-coordinate position. Window 2160 was the window last accessed after the frontmost window 2150 and is therefore only obscured by the frontmost window 2150. Window 2160 is shown with the number 2 to indicate that it has the next highest z-coordinate position. Window 2165 is next and is shown with the number 3 and window 2155 is the backmost window and is shown with the number 4.

When the stagger function is invoked at 2180, the y-coordinate position of the windows 2150-2165 is adjusted in accordance with the z-coordinate ordering of the windows 2150-2165. Since window 2150 has the highest z-coordinate position, its y-coordinate position is adjusted so that window 2150 is presented lower than the other windows 2155-2165 along the y-coordinate plane. Window 2160 has the next highest z-coordinate position. Accordingly, the y-coordinate position for window 2160 is adjusted so that the window 2160 is positioned just above window 2150 but below the other windows 2165 and 2155 along the y-coordinate plane. The y-coordinate positions for windows 2165 and 2155 are similarly adjusted relative to their z-coordinate positions.

In addition to the above-described embodiments which are used to switch between various windows of various applications, some embodiments of the present invention are used in a similar manner to switch focus between user interface elements, such as views, fields, groups, areas, etc., within the frontmost window itself. This allows the user to utilize the same or similar above-described actions, such as key events or touch events, to shift focus to the left or right, and therefore minimize the need to utilize a pointing device, such as a mouse or a touchscreen, to change the active focus within a frontmost window. To accomplish this, the linear switching software utilizes system API calls appropriate to the platform in order to ascertain a list of various UI elements within a particular window. From that list, the linear switcher gains access to further attributes of the listed UI elements, such as the type of UI element, and the coordinates within the window. Such data is then analyzed and potentially incorporated into the sorting processes previously described in order to provide additional points at which the switching process may stop along the x-axis. Such additional functionality may also be invocable separately from the above-described window switching functionality. In some embodiments, such additional functionality is activated on a per-application basis, and each such application may have a variable number of UI elements which may accept focus. Furthermore, such UI elements may be activated or deactivated based on certain defined trigger actions or user preference, and persisted across relaunch.

Figure 22:
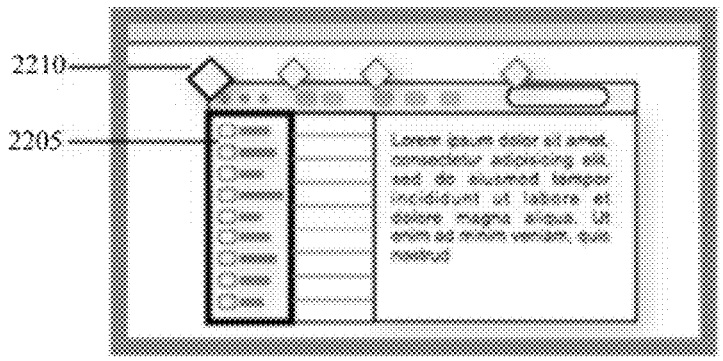
FIGS. 22 thru 25 depict a typical electronic mail application window that contains four UI elements which can accept key focus and using the linear switcher to switch between the UI elements.
Figure 23:
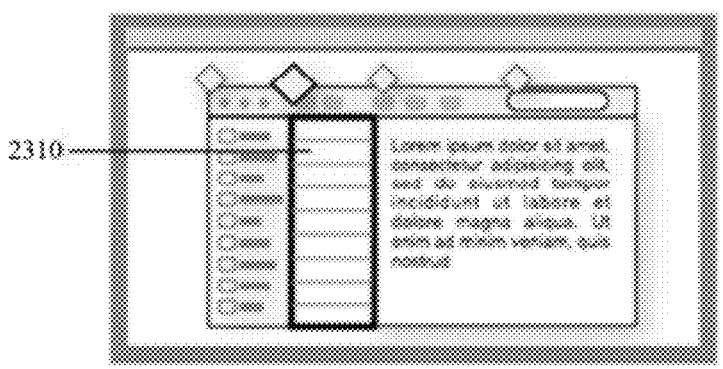
Figure 24:
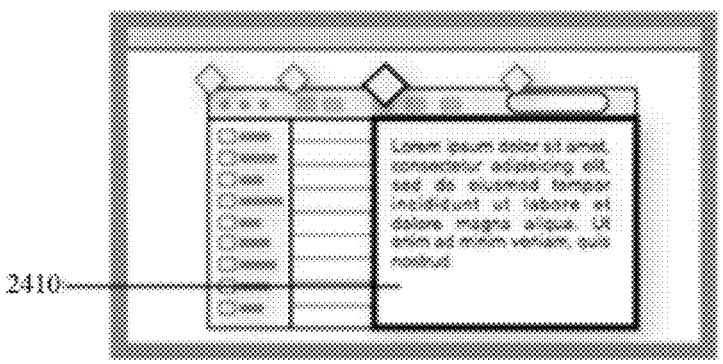
Figure 25:
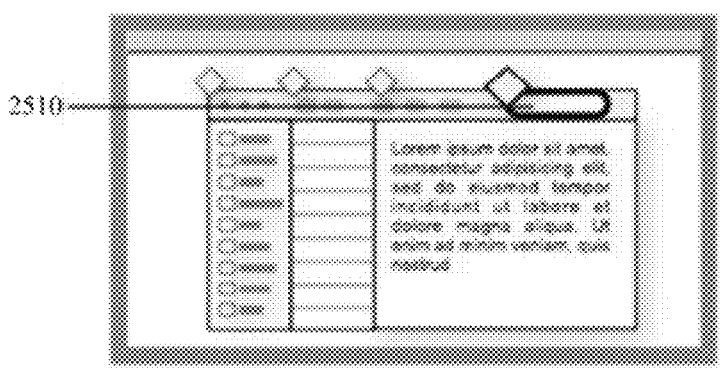

FIGS. 22 thru 25 depict a typical electronic mail application window that contains four UI elements which can accept key focus. The linear switcher is used to allow identification and easy switching between these key focus areas. In FIG. 22, the linear switcher has been invoked (by some method described above such as pressing and holding a key) and the current key-focused area is highlighted 2205, which in this mail application is the mailbox folder outline view. Also, symbols 2210 appear above all key focus areas, with the currently active key focus area being more prominently rendered. If the user releases the first key at this point, the highlighting and symbols fade away, and the user may be confident of which elements of the screen will be responsive to further input. If instead the user taps a key which is designated to select to the right, the highlighted area 2310 and symbol change to the message selection area as shown in FIG. 23. Tapping the same key again moves focus to the next focus area to the right 2410, which in this case is the message viewing and editing area as shown in FIG. 24. Yet another tap of the same key moves to the last focus area, which is a search text field 2510 depicted in FIG. 25.

Figure 26:
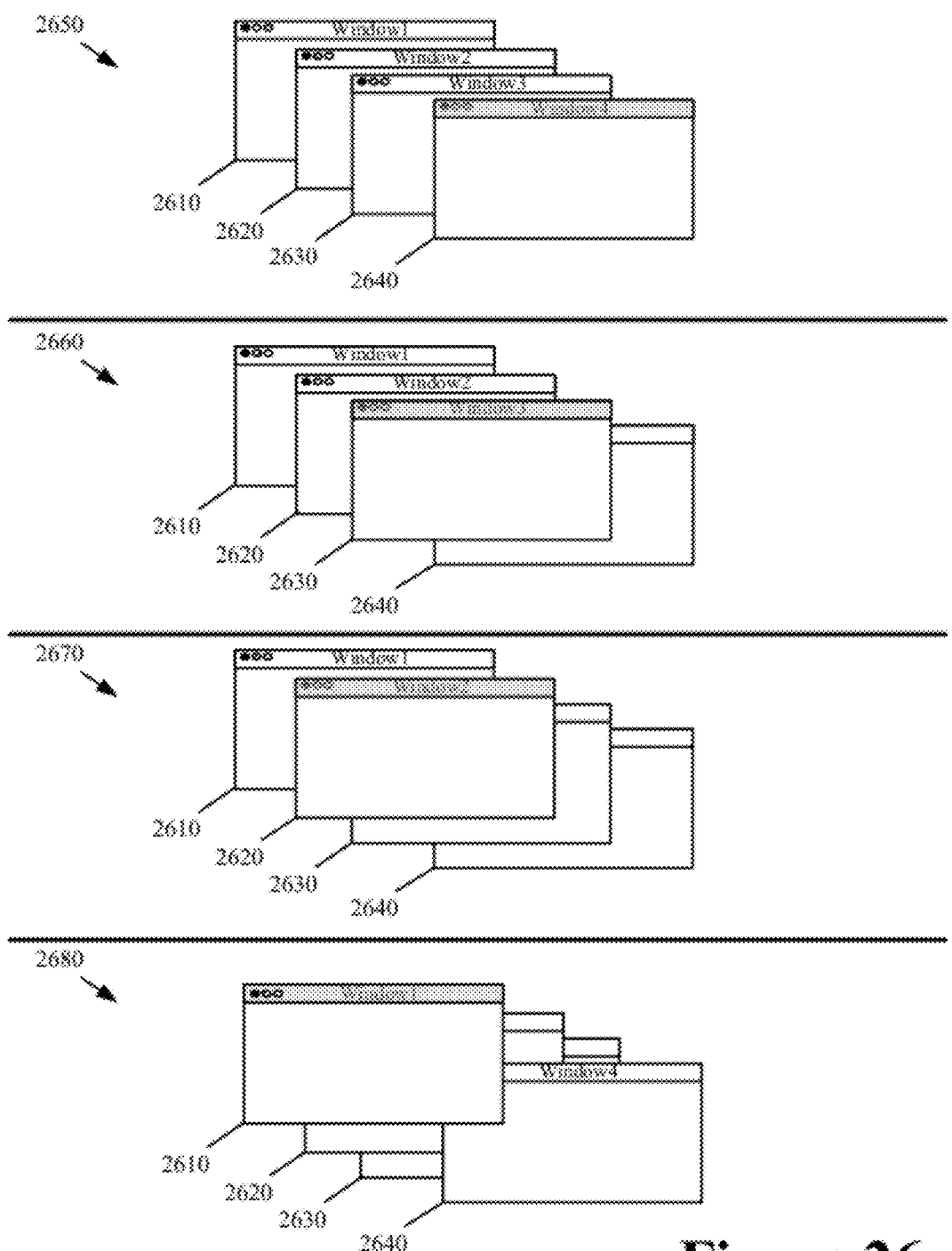
FIG. 26 illustrates the linear switcher raising the starting (or first) frontmost window to just beneath the final (or last) frontmost window upon exit of the process in accordance with some embodiments.

It should be noted that other embodiments utilizing differing graphical techniques, triggering mechanisms, or implementation variances could be easily conceived, but would nonetheless essentially analogize the above described embodiments, and therefore fall within the purview of the present invention. Furthermore, as one skilled in the art would understand in light of the present disclosure, the z-ordering of the windows upon exiting the linear switcher may be set to any particular ordering. For example, the starting (or first) frontmost window may be raised to just beneath the final (or last) frontmost window upon exiting the process, which may avoid some obstruction by intermediate windows. FIG. 26 provides an illustration of the linear switcher raising the starting (or first) frontmost window to just beneath the final (or last) frontmost window upon exit of the process in accordance with some embodiments.

FIG. 26 depicts four windows 2610, 2620, 2630, and 2640 at four different stages 2650, 2660, 2670, and 2680 while the linear switcher is in use. Stage 2650 illustrates the starting layout of the windows 2610, 2620, 2630, 2640 with the rightmost window 2640 being frontmost, window 2630 being beneath window 2640 so as to be obscured only by window 2640, window 2620 being beneath window 2630 so as to be obscured by windows 2640 and 2630, and window 2610 being beneath window 2620 so as to be obscured by windows 2640, 2630, and 2610.

At stage 2660, the linear switcher is invoked (by pressing and holding a first keyboard key) and is used to cycle one window to the left (by continuing the hold of the first keyboard key while tapping a second keyboard key) to select window 2630 as the frontmost window. In so doing, window 2630 is temporarily made frontmost and window 2640 is dropped beneath window 2630. The user continues to operate the linear switcher at stage 2670 (by holding the first keyboard key) and cycles to the left once more (by again tapping the second keyboard key). Consequently at stage 2670, window 2620 is now temporarily frontmost and window 2630 is dropped beneath window 2620 and the first window, window 2640 is dropped beneath window 2630.

The user continues to operate the linear switcher at stage 2680, by cycling to the left once more. The user then exits the linear switcher application by releasing the first keyboard key that was initially used to invoke the linear switching application. Consequently at stage 2680, the window 2610 becomes frontmost and remains frontmost after exiting the linear switcher, and the linear switcher also raises the level of the starting frontmost window, window 2640, to be just beneath the final frontmost window, window 2610, before exiting, so that its content may be less obscured.

It should be noted that in some embodiments, as the user operates the linear switcher by switching windows left and right, the selected and highlighted window appears to be temporarily frontmost, but is not actually frontmost until and unless the user then releases the first keyboard key to exit the linear switcher mode. This optimization is done to make operations more fluid by reducing unnecessary intermediate window and application switching operations that would otherwise be performed by the OS at each stage.

As was noted above, the linear switcher is implemented as one or more software applications or processes that execute on one or more physical computing devices. The linear switcher may be specified as a set of instructions recorded to a non-transitory computer-readable storage medium (also referred to as computer-readable medium) thereby providing an article of manufacture. When these instructions are executed by one or more computational element(s) (such as processors or other computational elements like ASICs and FPGAs), they cause the computational element(s) to perform the actions indicated in the instructions. Computer and computer system are meant in their broadest sense, and can include any electronic device with a processor including cellular telephones, smartphones, tablet devices, laptops, netbooks, home entertainment and gaming systems, household appliances, automotive devices, etc. Examples of computer-readable media include, but are not limited to, CD-ROMs, flash drives, RAM chips, hard drives, EPROMs, etc.

The linear switcher transforms general purpose computing resources of the computing devices on which it executes to implement and perform the specified x-axis based window switching function. Stated differently, the computing devices on which the linear switcher executes comprise general purpose processors, random access memory, non-volatile storage, and network resources that are transformed by the linear switcher into one or more specific purpose machines that perform the x-axis based window switching function. Some of the tangible results produced by the linear switcher include the switching between different windows in a GUI and the adaptation of a key-based input device and other input devices to perform the linear switching functionality.

Figure 27:
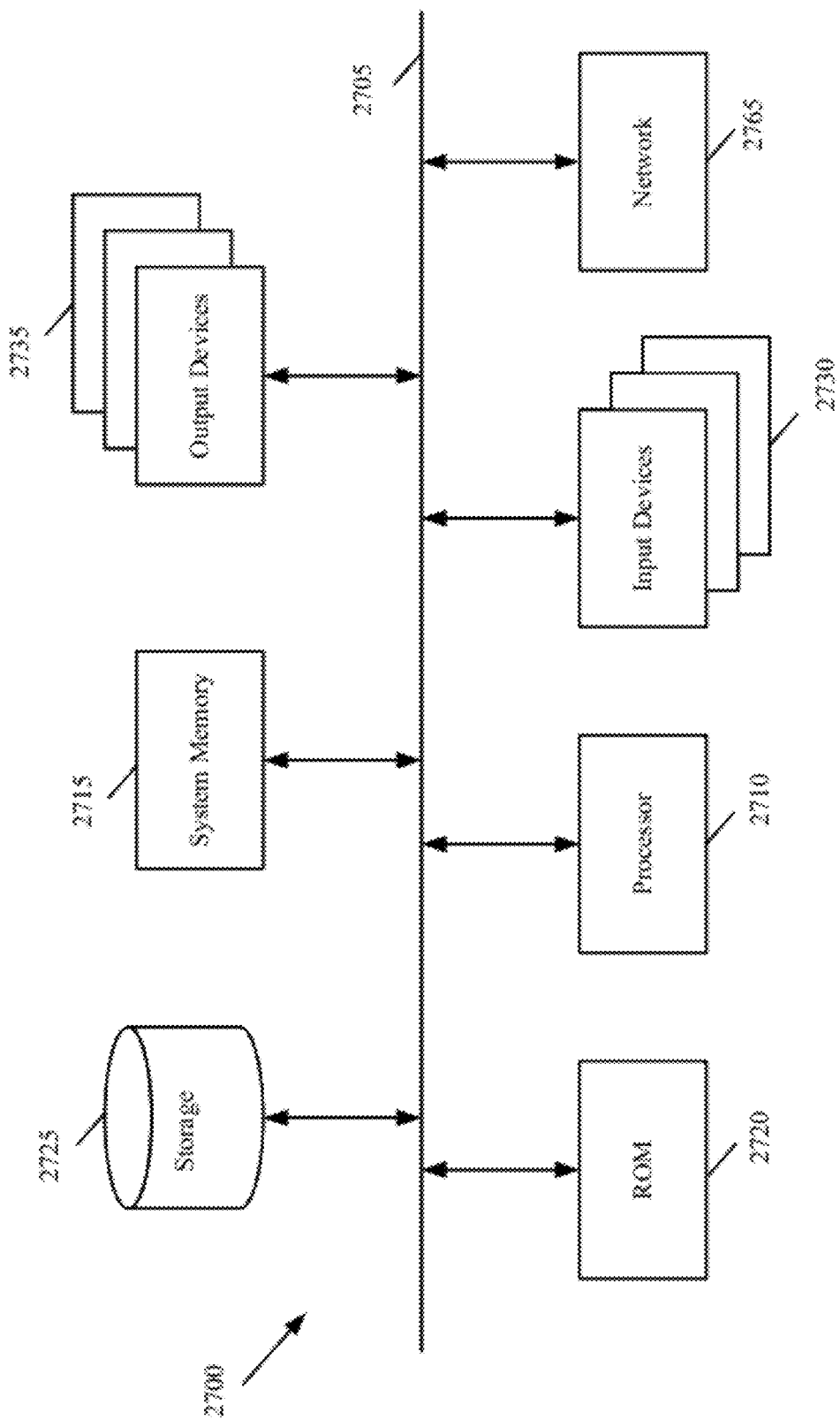
FIG. 27 illustrates a computer system with which some embodiments are implemented.

FIG. 27 illustrates a computer system with which some embodiments are implemented. Such a computer system includes various types of non-transitory computer-readable mediums and interfaces for various other types of computer-readable mediums that implement the various processes, modules, and engines described above for the linear switcher. Computer system 2700 includes a bus 2705, a processor 2710, a system memory 2715, a read-only memory 2720, a permanent storage device 2725, input devices 2730, and output devices 2735. The bus 2705 collectively represents all system, peripheral, and chipset buses that communicatively connect the numerous internal devices of the computer system 2700. For instance, the bus 2705 communicatively connects the processor 2710 with the read-only memory 2720, the system memory 2715, and the permanent storage device 2725. From these various memory units, the processor 2710 retrieves instructions to execute and data to process in order to execute the processes of the invention. The processor 2710 is a processing device such as a central processing unit, integrated circuit, graphical processing unit, etc.

The read-only-memory (ROM) 2720 stores static data and instructions that are needed by the processor 2710 and other modules of the computer system. The permanent storage device 2725, on the other hand, is a read-and-write memory device. This device is a non-volatile memory unit that stores instructions and data even when the computer system 2700 is off. Some embodiments of the invention use a mass-storage device (such as a magnetic or optical disk and its corresponding disk drive) as the permanent storage device 2725.

Other embodiments use a removable storage device (such as a flash drive) as the permanent storage device Like the permanent storage device 2725, the system memory 2715 is a read-and-write memory device. However, unlike the storage device 2725, the system memory is a volatile read-and-write memory, such as random access memory (RAM). The system memory stores some of the instructions and data that the processor needs at runtime. In some embodiments, the processes are stored in the system memory 2715, the permanent storage device 2725, and/or the read-only memory 2720.

The bus 2705 also connects to the input and output devices 2730 and 2735. The input devices enable the user to communicate information and select commands to the computer system. The input devices 2730 include any of a capacitive touchscreen, resistive touchscreen, any other touchscreen technology, a trackpad that is part of the computing system 2700 or attached as a peripheral, a set of touch sensitive buttons or touch sensitive keys that are used to provide inputs to the computing system 2700, or any other touch sensing hardware that detects multiple touches and that is coupled to the computing system 2700 or is attached as a peripheral. The input device 2730 also include alphanumeric keypads (including physical keyboards and touchscreen keyboards), pointing devices (also called "cursor control devices"). The input devices 2730 also include audio input devices (e.g., microphones, MIDI musical instruments, etc.). The output devices 2735 display images generated by the computer system. The output devices include printers and display devices, such as cathode ray tubes (CRT) or liquid crystal displays (LCD).

Finally, as shown in FIG. 27, bus 2705 also couples computer 2700 to a network 2765 through a network adapter (not shown). In this manner, the computer can be a part of a network of computers (such as a local area network ("LAN"), a wide area network ("WAN"), or an Intranet, or a network of networks, such as the Internet. For example, the computer 2700 may be coupled to a web server (network 2765) so that a web browser executing on the computer 2700 can interact with the web server as a user interacts with a GUI that operates in the web browser.

As mentioned above, the computer system 2700 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

While the present invention has been described with reference to numerous specific details, one of ordinary skill in the art will recognize after disclosure that the invention can be embodied in other specific forms, yet these would not depart from the scope and spirit of the invention as herein disclosed.

I claim:

1. A non-transitory computer-readable storage medium with an executable program stored thereon, wherein said program instructs a microprocessor to perform sets of instructions for:

generating an array identifying a plurality of open windows in a graphical user interface (GUI), wherein said GUI comprises at least an x-coordinate plane and a y-coordinate plane in which a position of each open window of the plurality of open windows is defined, and wherein said array comprises at least an x-coordinate position for each window of the plurality of open windows and an index designating an array position for each window of the plurality of open windows;

sorting said array by ordering the plurality of open windows in the array according to an increasing x-coordinate position of each window of the plurality of open windows;

selecting an index in the sorted array identifying a first open window of the plurality of open windows that is currently frontmost in said GUI;

increasing said index in response to a first directional input, wherein increasing said index comprises selecting a second open window of the plurality of open windows with a next greater x-coordinate position in the sorted array than the x-coordinate position of said first open window, and changing the frontmost window to be said second open window, wherein said changing the frontmost window and said first directional input does not produce a movement of any other window of the plurality of open windows; and decreasing said index in response to a second directional input that is opposite to the first directional input, wherein decreasing said index comprises selecting a third open window of the plurality of open windows with a next lesser x-coordinate position in the sorted array than the x-coordinate position of said first open window, and changing the frontmost window to be said third open window, wherein said changing the frontmost window and said second directional input does not produce a movement of any other window of the plurality of open windows.

2. The non-transitory computer-readable storage medium of claim 1, wherein said program further comprises a set of instructions for filtering the plurality of open windows based on a selected operating mode of a plurality of operating modes.

3. The non-transitory computer-readable storage medium of claim 2, wherein filtering the plurality of open windows comprises discarding from said plurality of open windows, any window that is hidden or minimized when a first operating mode of the plurality of operating modes is active.

4. The non-transitory computer-readable storage medium of claim 3, wherein filtering the plurality of open windows comprises discarding from said plurality of open windows, any window that is not associated with an application that is currently frontmost in said GUI when a second operating mode of the plurality of operating modes is active.

5. The non-transitory computer-readable storage medium of claim 3, wherein filtering the plurality of open windows comprises discarding from said plurality of open windows, any window that is not visible on-screen in said GUI when a second operating mode of the plurality of operating modes is active.

6. The non-transitory computer-readable storage medium of claim 1, wherein said program further comprises a set of instructions for displaying a graphical indicator for each window of the plurality of open windows in said GUI, said graphical indicator identifying a position of a window in said GUI irrespective of whether said window is obscured or overlapped by another window.

7. The non-transitory computer-readable storage medium of claim 6, wherein the set of instructions for displaying a graphical indicator comprises displaying said graphical indicator for each window of the plurality of open windows by extending said graphical indicator to at least one of a position at the top of said GUI and a position at the bottom of said GUI.

8. The non-transitory computer-readable storage medium of claim 1, wherein said program further comprises a set of instructions for providing an audible notification for identifying a window when changing that window to be frontmost.

9. The non-transitory computer-readable storage medium of claim 8, wherein the set of instructions for providing an audible notification comprises providing a unique audible notification for each window of the plurality of open windows to audibly indicate a position of the window relative to the other windows of the plurality of the open windows.

10. The non-transitory computer-readable storage medium of claim 1, wherein said program further comprises a set of instructions for reordering the plurality of open windows in the array when at least one of a window of the plurality of open windows is moved, a window of the plurality of open windows is resized, a window of the plurality of open windows is closed, and a new window not of the plurality of open windows is opened.

11. The non-transitory computer-readable storage medium of claim 1, wherein generating said array comprises entering the plurality of open windows to the array according to a front-to-back ordering of the plurality of open windows in the GUI, wherein the front-to-back ordering identifies an order in which each window of the plurality of open windows is last accessed.

12. A method for providing a graphical user interface (GUI) that enhances interactions with a computer, the computer having at least a processor, the method comprising:
by operation of at least the computer processor,
presenting a plurality of open windows at various positions in said GUI with one window of the plurality of open windows currently frontmost;
detecting a first input;
selecting in response to said first input, different sets of the plurality of open windows based on which operating mode of a plurality of operating modes is active, wherein the different sets of open windows comprises a first set of windows discarding any window from the plurality of open windows not owned by the current frontmost application, a second set of windows discarding any window from the plurality of open windows not visible in the GUI, and a third set of all open windows;
obtaining an x-coordinate position for each window of a set of open windows selected according to the active operating mode;
ordering the set of open windows according to an increasing x-coordinate position of each window of the set of open windows;
presenting a set of graphical indicators in the GUI to identify each window of the set of open windows, wherein presenting the set of graphical indicators comprises presenting a graphical indicator for each window of the set of open windows along a common y-coordinate plane in the GUI at an x-coordinate position that corresponds to the x-coordinate position of the window identified by the graphical indicator;
detecting a directional second input; and
changing the frontmost window of the GUI based on the directional second input, wherein changing the frontmost window comprises (i) obtaining the x-coordinate position of a first window from the set of open windows that is frontmost prior to the directional second input, (ii) selecting based on said ordering, a second window from the set of open windows with the second window x-coordinate position being one of the next greater or next lesser x-coordinate position from the set of open windows to the first window x-coordinate position, and making the second window frontmost in the GUI instead of the first window.

13. The method of claim 12 further comprising enabling the directional second input in response to continued invocation of the first input for enabling window switching functionality.

14. The method of claim 12, wherein said first input is keyed to a first keyboard key of a keyboard used to interact with said GUI and pressing and holding said first keyboard key invokes said first input, and wherein said directional second input is keyed to a second keyboard key of the keyboard and tapping of said second keyboard key invokes said directional second input.

15. The method of claim 12 further comprising resizing the frontmost window in response to invocation of a third input.

16. The method of claim 12, wherein presenting the set of graphical indicators further comprises displaying for each graphical indicator of the set of graphical indicators, a connector extending from the graphical indicator to the window of the set of open windows identified by the graphical indicator.

17. A non-transitory computer-readable storage medium with an executable program stored thereon, wherein said program instructs a microprocessor to perform sets of instructions for:
identifying a plurality of open windows in a graphical user interface (GUI), wherein said GUI comprises at least an x-coordinate plane, a y-coordinate plane, and a z-coordinate plane in which a position of each open window of the plurality of open windows is defined with an x-coordinate position, y-coordinate position, and a z-coordinate position;
obtaining the x-coordinate position, the y-coordinate position, and the z-coordinate position for each window of the plurality of open windows;
determining an ordering of the plurality of open windows based on the z-coordinate position of each window of the plurality of open windows, wherein said determining based on the z-coordinate position identifies an order in which the plurality of open windows were last accessed by a user, and wherein said determining further identifies a most recently accessed frontmost first window of the plurality of open windows having a largest z-coordinate position and a least recently accessed backmost second window of the plurality of open windows having a smallest z-coordinate position;
repositioning the plurality of open windows in the GUI by adjusting the y-coordinate position of the plurality of windows in direct correlation to the z-coordinate position of the plurality of open windows, wherein said repositioning comprises one of (i) moving the frontmost first window to a top of the GUI and the backmost second window to a bottom of the GUI with other windows of the plurality of open windows above the y-coordinate plane of the backmost second window based on increasing z-coordinate position, and (ii) moving the frontmost first window to the bottom of the GUI and the backmost second window to the top of the GUI with other windows of the plurality of open windows below the y-coordinate plane of the backmost second window based on increasing z-coordinate position, and wherein moving the frontmost first window to the top of the GUI and the backmost second window to the bottom of the GUI comprises increasing the y-coordinate position of the first frontmost window to be larger than the y-coordinate position of all other of the plurality of open windows while decreasing the y-coordinate position of the backmost second window to be smaller than the y-coordinate position of all other of the plurality of open windows.

18. The non-transitory computer-readable storage medium of claim 17, wherein the set of instructions for repositioning the plurality of open windows is performed in response to a press of a particular keyboard key.

19. The non-transitory computer-readable storage medium of claim 18, wherein the program further comprises a set of instructions for readjusting the y-coordinate position of each window of the plurality of windows upon release of the particular keyboard key, wherein said readjusting returns each window of the plurality of open windows to its y-coordinate position prior to said repositioning.

20. The non-transitory computer-readable storage medium of claim 17, wherein said repositioning further comprises maintaining the x-coordinate position and the z-coordinate position of each window of the plurality of windows along the x-coordinate plane and the z-coordinate plane and does not adjust a size of each window of the plurality of windows.

* * * * *